United States Patent
Lee et al.

(10) Patent No.: US 12,386,710 B2
(45) Date of Patent: Aug. 12, 2025

(54) METHOD OF RECOVERING DATA IN STORAGE DEVICE USING NETWORK AND STORAGE DEVICE PERFORMING THE SAME

(71) Applicant: SAMSUNG ELECTRONICS CO., LTD., Suwon-si (KR)

(72) Inventors: Jinwook Lee, Suwon-si (KR); Sooyoung Ji, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 18/196,258

(22) Filed: May 11, 2023

(65) Prior Publication Data
US 2024/0004762 A1 Jan. 4, 2024

(30) Foreign Application Priority Data
Jul. 1, 2022 (KR) .......................... 10-2022-0081221

(51) Int. Cl.
*G06F 11/14* (2006.01)
*G06F 11/07* (2006.01)

(52) U.S. Cl.
CPC ...... *G06F 11/1464* (2013.01); *G06F 11/0772* (2013.01); *G06F 11/1469* (2013.01)

(58) Field of Classification Search
CPC ............. G06F 11/1464; G06F 11/0772; G06F 11/1469
See application file for complete search history.

(56) References Cited

U.S. PATENT DOCUMENTS

| | | |
|---|---|---|
| 7,885,938 B1 | 2/2011 | Greene et al. |
| 8,112,598 B2 | 2/2012 | Kawada et al. |
| 9,015,527 B2 | 4/2015 | Mohanta et al. |
| 9,223,793 B1 | 12/2015 | Mahalingam et al. |
| 9,239,782 B2 | 1/2016 | Yang |
| 10,783,029 B2 | 9/2020 | Huh et al. |

(Continued)

FOREIGN PATENT DOCUMENTS

| | | |
|---|---|---|
| JP | 10-333958 A | 12/1998 |
| JP | 2009-238015 A | 10/2009 |

(Continued)

OTHER PUBLICATIONS

Extended European Search Report dated Dec. 1, 2023, issued by European Patent Office in European Patent Application No. 23167492.0.

*Primary Examiner* — Matthew M Kim
*Assistant Examiner* — Audrey Emma Whitesell
(74) *Attorney, Agent, or Firm* — Sughrue Mion, PLLC

(57) ABSTRACT

A method of recovering data in a storage device is provided. The method includes: receiving backup storage information associated with a backup storage device from a host device, both the host device and the backup storage device being external to the storage device, and the backup storage device being configured to store backup data corresponding to first data; performing a data read operation on the first data; based on an unrecoverable data failure occurring while reading the first data, directly receiving the backup data corresponding to the first data from the backup storage device based on the backup storage information; and performing a data recovery operation for the first data based on the backup data.

19 Claims, 21 Drawing Sheets

(56) References Cited

U.S. PATENT DOCUMENTS

| | | |
|---|---|---|
| 11,068,365 B2 | 7/2021 | Springberg |
| 11,194,761 B2 * | 12/2021 | Khandkar ............. G06F 16/113 |
| 11,243,709 B2 | 2/2022 | Noh et al. |
| 11,288,189 B2 | 3/2022 | Jin et al. |
| 2011/0138118 A1 | 6/2011 | Cheong |
| 2014/0215265 A1 | 7/2014 | Mohanta et al. |
| 2015/0339198 A1 | 11/2015 | Kato et al. |
| 2020/0042390 A1 | 2/2020 | Roberts |
| 2020/0341870 A1 | 10/2020 | Frolikov |
| 2021/0056023 A1 | 2/2021 | Jin et al. |
| 2021/0089208 A1 | 3/2021 | Jin et al. |
| 2021/0182152 A1 | 6/2021 | Shin et al. |
| 2022/0179786 A1 | 6/2022 | Jin et al. |

FOREIGN PATENT DOCUMENTS

| | | | |
|---|---|---|---|
| KR | 10-1282443 B1 | 7/2013 | |
| KR | 10-2189607 B1 | 12/2020 | |
| KR | 10-2021-0076497 A | 6/2021 | |
| WO | WO-9844423 A1 * | 10/1998 | .......... G06F 11/2058 |

\* cited by examiner

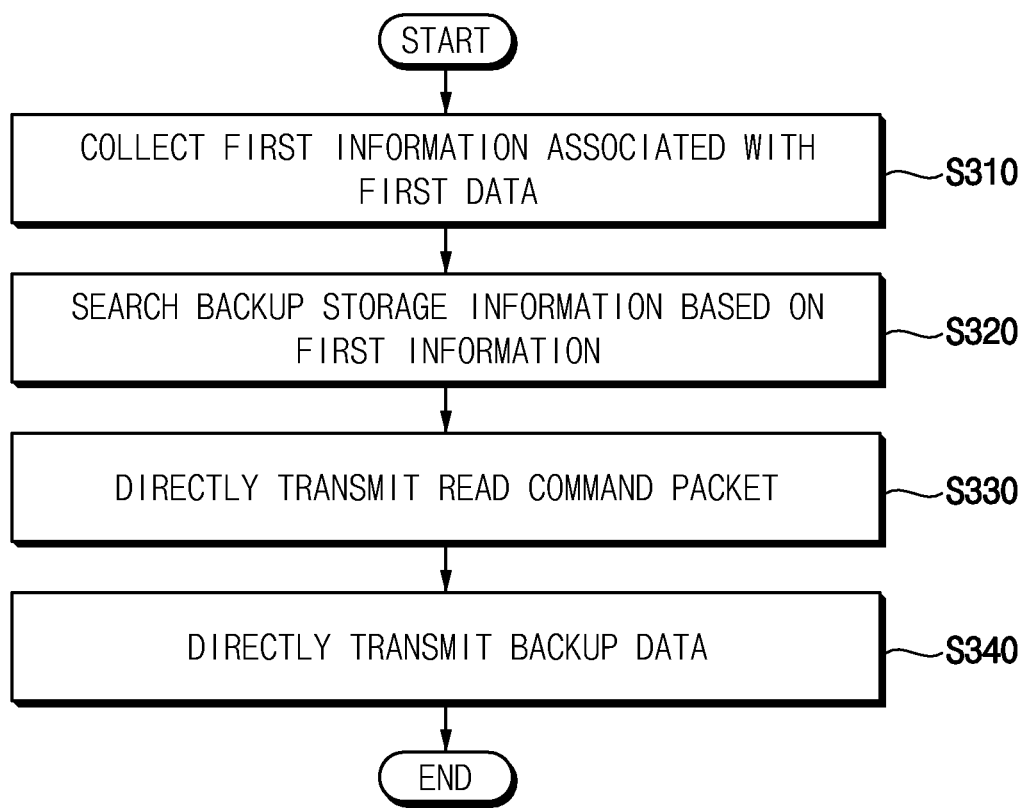

METHOD OF RECOVERING DATA IN STORAGE DEVICE USING NETWORK AND STORAGE DEVICE PERFORMING THE SAME

CROSS-REFERENCE TO RELATED APPLICATION

This application claims priority to Korean Patent Application No. 10-2022-0081221 filed on Jul. 1, 2022 in the Korean Intellectual Property Office, the disclosure of which is incorporated herein by reference in its entirety.

BACKGROUND

1. Field

Example embodiments relate generally to semiconductor integrated circuits, and more particularly to methods of recovering data in storage devices using networks, and storage devices performing the methods of recovering data.

2. Description of Related Art

A storage system includes a host device and a storage device, and the storage device may be a memory system including a memory controller and a memory device or only a memory device. In the storage system, the host device and the storage device are connected to each other through various interface standards, such as universal flash storage (UFS), serial advanced technology attachment (SATA), small computer system interface (SCSI), serial attached SCSI (SAS), embedded multi-media card (eMMC), nonvolatile memory express (NVMe), etc. Recently, NVMe over fabrics (NVMe-oF), which allows data input/output by directly accessing NVMe through a network, has been applied.

SUMMARY

One or more example embodiments provide a method of recovering data in a storage device capable of efficiently restoring damaged data while reducing load on a network and reducing performance degradation.

One or more example embodiments provide a storage device that performs the method of recovering data.

According to example embodiments, a method of recovering data in a storage device, includes: receiving backup storage information associated with a backup storage device from a host device, both the host device and the backup storage device being external to the storage device, and the backup storage device being configured to store backup data corresponding to first data; performing a data read operation on the first data; based on an unrecoverable data failure occurring while reading the first data, directly receiving the backup data corresponding to the first data from the backup storage device based on the backup storage information; and performing a data recovery operation for the first data based on the backup data.

According to example embodiments, a storage device includes: a nonvolatile memory including a plurality of storage regions; and a storage controller configured to: receive backup storage information associated with a backup storage device from a host device, both the host device and the backup storage device being external to the storage device, and the backup storage device configured being to store backup data corresponding to first data; perform a data read operation on the first data; based on an unrecoverable data failure occurring while reading the first data, directly receive the backup data corresponding to the first data from the backup storage device based on the backup storage information; and perform a data recovery operation for the first data based on the backup data.

According to example embodiments, a method of recovering data in a storage device, the method including: performing a data write operation on first data; receiving, from a host device, backup storage information associated with a backup storage device, both the host device and the backup storage device being external to the storage device, and the backup storage device being configured to store backup data corresponding to the first data; performing a data read operation on the first data; based on an unrecoverable data failure occurring while reading the first data, directly receiving the backup data corresponding to the first data from the backup storage device based on the backup storage information, the backup data being received from the backup storage device without passing through the host device; and performing a data recovery operation for the first data based on the backup data. The receiving the backup storage information includes: transmitting, by the storage device, a backup storage information request to the host device; transmitting, by the host device, the backup storage information to the storage device based on the backup storage information request; and recording, by the storage device, the backup storage information. The directly receiving the backup data includes: collecting first information associated with the first data on which the unrecoverable data failure has occurred; searching the backup storage information based on the first information; directly transmitting, by the storage device, a read command packet for reading the backup data to the backup storage device; and directly transmitting, by the backup storage device, the backup data to the storage device based on the read command packet.

BRIEF DESCRIPTION OF DRAWINGS

The above and other aspects and features will be more apparent from the following description of example embodiments, taken in conjunction with the accompanying drawings.

FIG. 10 is a flowchart illustrating directly receiving backup data according to example embodiments.

DETAILED DESCRIPTION

Various example embodiments will be described more fully with reference to the accompanying drawings, in which embodiments are shown. Embodiments described herein are provided as examples, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
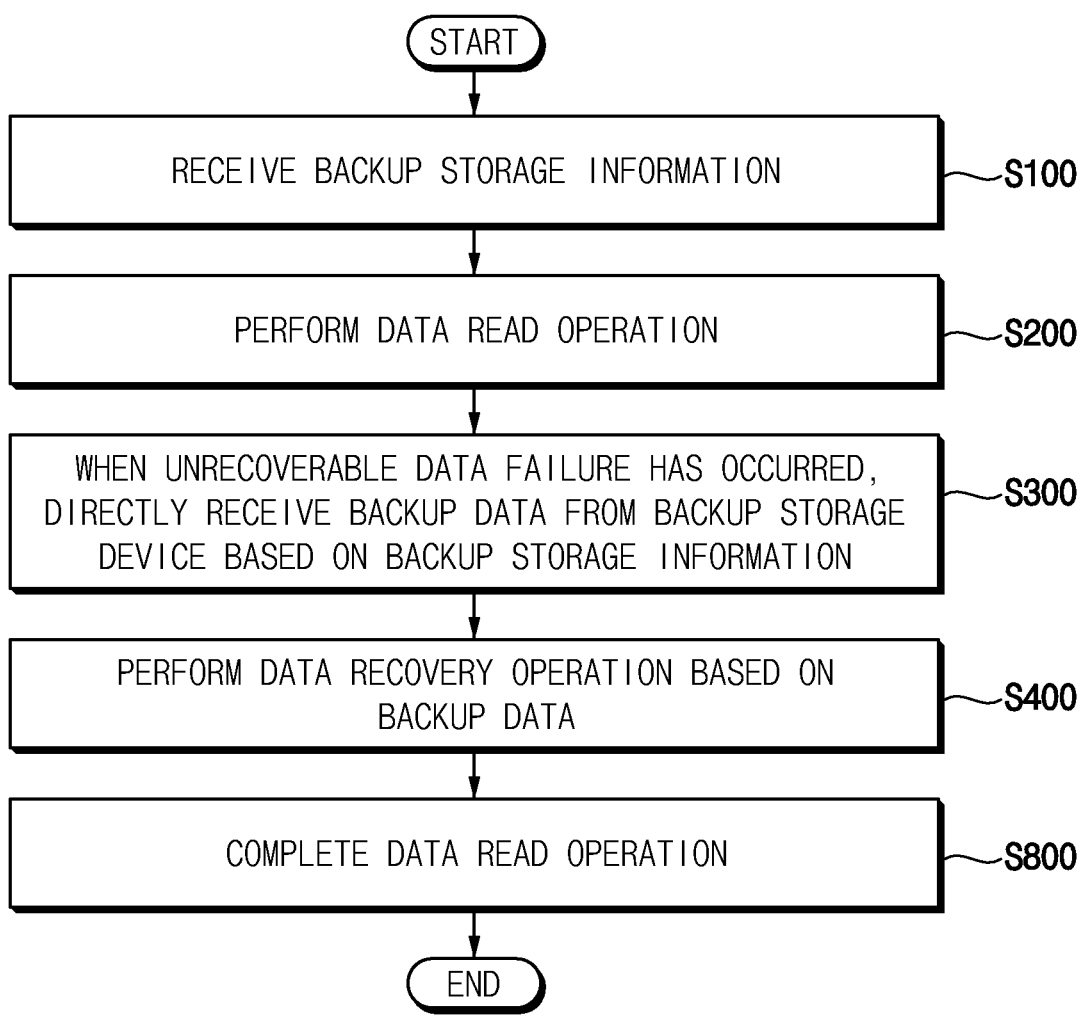
FIG. 1 is a flowchart illustrating a method of recovering data in a storage device according to example embodiments.

FIG. 1 is a flowchart illustrating a method of recovering data in a storage device according to example embodiments.

Referring to FIG. 1, a method of recovering data in a storage device according to example embodiments is performed by a storage device that includes a storage controller and a plurality of storage regions (or storage areas). The plurality of storage regions may be formed or provided by a plurality of nonvolatile memories. Configurations of the storage device and a storage system including the storage device will be described with reference to FIG. 2.

In the method of recovering data in the storage device according to example embodiments, backup storage information associated with or related to a backup storage device is received from a host device (operation S100). Both the host device and the backup storage device are located or disposed outside the storage device. The backup storage device is a storage medium that stores backup data corresponding to first data stored in the storage device. Operation S100 will be described with reference to FIG. 6.

When the first data is written or stored into the storage device, the backup data that is substantially identical to or the same as the first data may be generated by replicating or copying the first data, the backup data may be written or stored into the backup storage device different from the storage device, and thus the first data may be recovered or restored using the backup data even if the first data is damaged later. The storage device may be referred to as a primary storage device, and the backup storage device may be referred to as a secondary storage device. The backup data may be referred to as replication data or duplication data.

In some example embodiments, the host device, the storage device and the backup storage device may be connected to each other through a network. For example, the network may be implemented based on a nonvolatile memory express (NVMe) over fabrics (NVMe-oF) protocol. Connections between the host device, the storage device and the backup storage device will be described with reference to FIG. 2.

In some example embodiments, the storage device and the backup storage device may be physically different from each other. For example, the backup storage device may be disposed in the same space or adjacent to a space in which the storage device is disposed. For another example, the backup storage device may be disposed separated from the space in which the storage device is disposed. An arrangement of the backup storage device will be described with reference to FIG. 18.

A data read operation is performed on or for the first data (operation S200). For example, the data read operation may be performed based on an external request (e.g., a read request from the host device). For another example, the data read operation may be internally performed by the storage device itself. For example, the data read operation may be similar to a general (or normal) data read operation, and may include an operation of checking or determining whether an unrecoverable data failure (or damage or corruption) has occurred. Operation S200 will be described with reference to FIG. 8.

When the unrecoverable data failure has occurred on the first data to be read, the backup data corresponding to the first data is directly received from the backup storage device based on the backup storage information (operation S300). For example, the unrecoverable data failure may include an uncorrectable error (UE), which is an error that cannot be corrected by an error correction code (ECC) engine.

In some example embodiments, operation S300 may be performed directly between the backup storage device and the storage device without passing through the host device (e.g., without intervention or assistance of the host device). Operation S300 will be described with reference to FIG. 10.

A data recovery operation is performed on or for the first data based on the backup data (operation S400). For example, the data recovery operation may be similar to a general (or normal) data recovery operation. Operation S400 will be described with reference to FIG. 12.

The data read operation on the first data may be completed based on a result of the data recovery operation (operation S800). For example, the first data may be transmitted to the host device in response to the read request from the host device.

In some example embodiments, operation S100 may be described as an operation of off-loading the data recovery process, which is performed using the backup storage information and the backup data, from the host device to the storage device. The term "off-loading" refers to transferring resource-intensive computational tasks to a separate processor, such as a hardware accelerator, or to an external platform, such as a cluster, grid, or a cloud. According to some aspects, off-loading an application such as an image rendering application or a mathematical computation to a co-processor may be used to accelerate the application or mathematical computation. Off-loading applications and computations to an external platform over a network may provide increased computing power and help to overcome hardware limitations of a device, such as limited computational power, storage, and energy.

In the method of recovering data in the storage device according to example embodiments, the storage device may recognize the backup storage information associated with the backup storage device in advance. When the unrecoverable data failure has occurred on the first data to be read, the storage device may receive the backup data directly from the backup storage device without the intervention of the host device and may perform the data recovery operation based on the backup data. The host device may perform normal operations without waiting for a completion of the data recovery operation, and thus the performance degradation may be reduced and the intervention or interference of the host device may be minimized. Accordingly, the load or overhead of the host device for the data recovery operation may be reduced, the data recovery operation may be performed with the minimal performance degradation, the traffic on the network may be reduced, and the storage device may be continuously used as much as possible.

Figure 2:
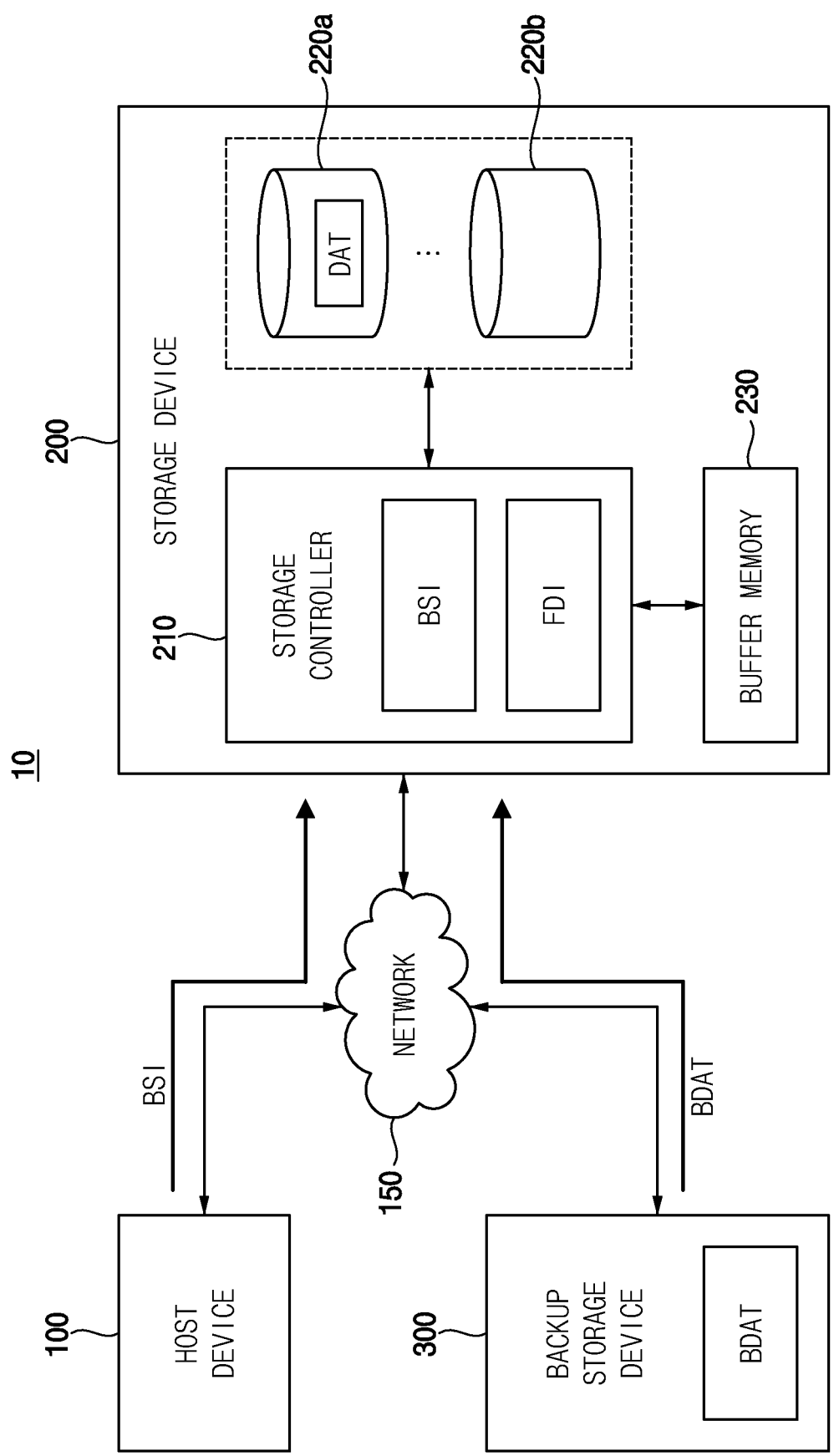
FIG. 2 is a block diagram illustrating a storage system including a storage device according to example embodiments.

FIG. 2 is a block diagram illustrating a storage system including a storage device according to example embodiments.

Referring to FIG. 2, a storage system 10 includes a host device 100, a network 150, a storage device 200 and a backup storage device 300.

The host device 100 controls overall operations of the storage system 10. The host device 100 may also include a host processor and a host memory. The host processor may control an operation of the host device 100. For example, the host processor may execute an operating system (OS). For example, the operating system may include a file system for file management, and a device driver for controlling peripheral devices including the storage device 200 at the operating system level. The host memory may store instructions and/or data that are executed and/or processed by the host processor.

In some example embodiments, the host device 100 may be implemented as a server. For example, the host device 100 may be an application server. For another example, the host device 100 may be a backup server that is called by the application server to perform data replication and/or data backup.

The network 150 may connect the host device 100, the storage device 200 and the backup storage device 300 with each other. The host device 100, the storage device 200 and the backup storage device 300 may communicate with each other or exchange data and/or signals through the network 150.

In some example embodiments, the network 150 may be a storage-only network, such as a storage area network (SAN). In other example embodiments, the network 150 may be a general network, such as a wide area network (WAN). For example, the network 150 may be implemented based on the NVMe-oF protocol, and may include Infiniband, remote direct memory access (RDMA) over converged Ethernet (RoCE) v3, internet wide area RDMA protocol (iWARP), fiber (or fibre) channel (FC) over Ethernet (FCoE), etc.

The storage device 200 may be accessed by the host device 100. The storage device 200 may include a storage controller 210, a plurality of storage regions 220a and 220b, and a buffer memory 230.

The storage controller 210 may control an operation of the storage device 200. For example, based on a request (e.g., a write request or a read request) received from the host device 200, the storage controller 210 may control the operation (e.g., a write operation or a read operation) of the storage device 200, and may control an operation of exchanging data (e.g., receiving and storing write data or transmitting read data) between the host device 100 and the storage device 200. For example, the storage controller 210 may generate a command (e.g., a write command or a read command) for controlling operations (e.g., a write operation or a read operation) of the plurality of storage regions 220a and 220b, may transmit the command to the plurality of storage regions 220a and 220b, and may control an operation of exchanging data (e.g., transmitting and programming write data or receiving read data) with the plurality of storage regions 220a and 220b. For example, the request received from the host device 100 may be referred to as a host command, and the command transmitted to the plurality of storage regions 220a and 220b may be referred to as a memory command.

The plurality of storage regions 220a and 220b may be controlled by the storage controller 210, and may store a plurality of data. For example, the plurality of storage regions 220a and 220b may store the meta data, various user data, or the like. For example, each of the plurality of storage regions 220a and 220b may include one or more nonvolatile memories.

In some example embodiments, the nonvolatile memory may include a NAND flash memory. In other example embodiments, the nonvolatile memory may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 230 may store instructions and/or data that are executed and/or processed by the storage controller 210, and may temporarily store data stored in or to be stored into the plurality of storage regions 220a and 220b. For example, the buffer memory 230 may include at least one of various volatile memories, e.g., a static random access memory (SRAM), a dynamic random access memory (DRAM), or the like.

In some example embodiments, the buffer memory 230 may be included in the storage controller 210.

The backup storage device 300 may be accessed by the host device 100. The backup storage device 300 may store backup data (or replication data) BDAT that is substantially identical to first data DAT stored in the storage device 200. The backup storage device 300 may have a configuration similar to that of the storage device 200. For example, the backup storage device 300 may include a storage controller, a plurality of storage regions and a buffer memory.

The storage device 200 and the backup storage device 300 may be physically different storage devices. In some example embodiments, both the storage device 200 and the backup storage device 300 may be disposed or located in a first space (e.g., in the same space). In other example embodiments, the storage device 200 may be disposed in a first space (e.g., a local space), and the backup storage device 300 may be disposed in a second space (e.g., a remote space) apart from the first space. For example, the same space may represent the same office on the same floor in the same building, and the different spaces apart from each other may represent offices on different floors in the same building or offices in different buildings. The storage devices that are physically distant (e.g., spaced apart from each other) may be connected and driven based on the network 150.

The storage device 200 and the storage controller 210 may perform the method of recovering data in the storage device according to example embodiments described with reference to FIG. 1. For example, the storage controller 210 may receive backup storage information BSI associated with the backup storage device 300, which stores the backup data BDAT for the first data DAT stored in the storage device 200, from the host device 100 through the network 150, and may store or record the backup storage information BSI. When an unrecoverable data failure occurs on the first data DAT while a data read operation is performed on the first data DAT, the storage controller 210 may collect first information FDI associated with the first data DAT, may search for the backup storage information BSI based on the first information FDI, may directly receive the backup data BDAT for the first data DAT from the backup storage device 300 through the network 150 based on the backup storage information BSI (e.g., without intervention of the host device 100), and may perform a data recovery operation for the first data DAT based on the backup data BDAT.

The storage controller 210 may include a configuration for requesting, receiving and recording the backup storage information BSI, and may include a configuration for collecting the first information FDI and searching the backup storage information BSI when irrecoverable data corruption occurs for the first data (DAT), which will be described with reference to FIG. 3.

In addition, the storage device 200 and the storage controller 210 may perform a method of recovering data in a storage device according to example embodiments, which will be described with reference to FIGS. 13 and 15.

In some example embodiments, the storage device 200 may be a solid state drive (SSD), a universal flash storage (UFS), a multi-media card (MMC) or an embedded multi-media card (eMMC). In other example embodiments, the storage device 200 may be one of a secure digital (SD) card, a micro SD card, a memory stick, a chip card, a universal serial bus (USB) card, a smart card, a compact flash (CF) card, or the like.

In some example embodiments, the storage system 10 may be any computing system, such as a personal computer (PC), a server computer, a data center, a workstation, a digital television, a set-top box, a navigation system, etc. In other example embodiments, the storage system 10 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

Figure 3:
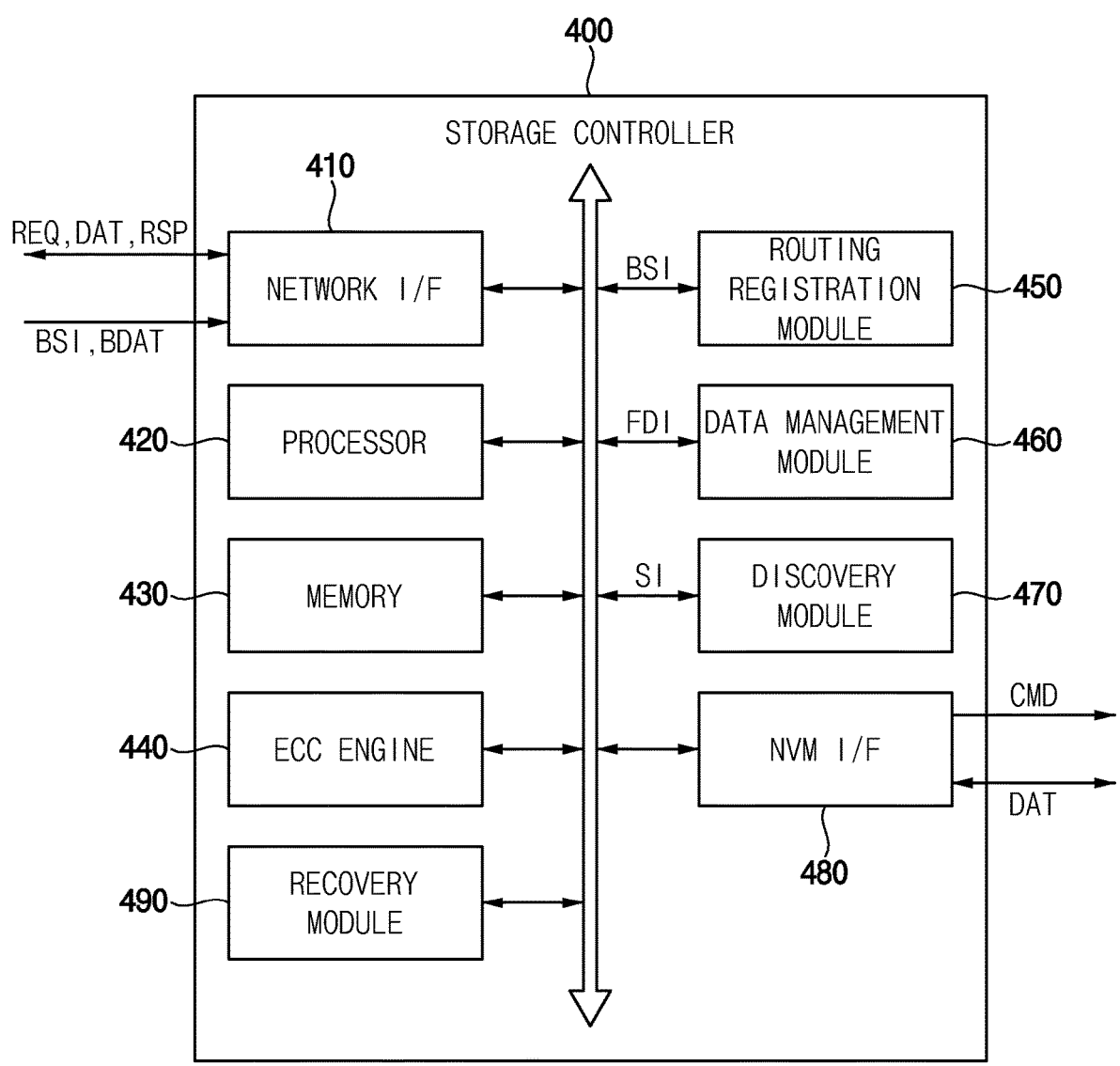
FIG. 3 is a block diagram illustrating an example of a storage controller according to example embodiments.

FIG. 3 is a block diagram illustrating an example of a storage controller according to example embodiments. For example, the storage controller may be provided in a storage device.

Referring to FIG. 3, a storage controller 400 may include a network interface (I/F) 410, a processor 420, a memory 430, an error correction code (ECC) engine 440, a routing registration module 450, a data management module 460, a discovery module 470, a nonvolatile memory (NVM) interface 480 and a recovery module 490.

The network interface 410 may provide connections between a network and a storage device (e.g., the network 150 and the storage device 200 in FIG. 2). For example, the network interface 410 may provide an interface corresponding to a protocol of the network for communication between the storage device and an external device (e.g., the host device 100 and/or the backup storage device 300 in FIG. 2).

For example, the network interface 410 may receive a request REQ from the host device through the network, may exchange data DAT with the host device, and may transmit a response RSP corresponding to the request REQ to the host device. For example, in a data write operation, the request REQ, the data DAT and the response RSP may be a write request, write data and a write complete response, respectively. For example, in a data read operation, the request REQ, the data DAT and the response RSP may be a read request, read data and a read completion response, respectively.

For example, the network interface 410 may receive the backup storage information BSI from the host device through the network, and may receive the backup data BDAT from the backup storage device. For example, when the backup storage information BSI is received, a backup storage information request may be transmitted to the host device, and a backup storage information reception completion response may be transmitted to the host device. For example, when the backup data BDAT is received, a read command packet for requesting the backup data BDAT may be transmitted to the backup storage device.

The nonvolatile memory interface 480 may exchange data with a plurality of storage regions (e.g., the plurality of storage regions 220a and 220b in FIG. 2) of the storage device. For example, the nonvolatile memory interface 480 may be configured to comply with a standard protocol, such as Toggle or open NAND flash interface (ONFI).

For example, the nonvolatile memory interface 480 may transmit a command CMD corresponding to the request REQ to the plurality of storage regions, and may exchange data DAT with the plurality of storage regions. For example, in a data write operation, the command CMD and the data DAT may be a write command and write data, respectively. For example, in a data read operation, the command CMD and the data DAT may be a read command and read data, respectively.

The processor 420 may control an operation of the storage controller 400. For example, the processor 420 may control an operation of the storage device, and may control respective components by employing firmware for operating the storage device.

The memory 430 may store instructions and data executed and processed by the processor 420. For example, the memory 430 may be implemented with a volatile memory, such as a DRAM, a SRAM, a cache memory, or the like.

A flash translation layer (FTL) may be implemented by the processor 420 and the memory 430. The flash translation layer may perform various functions, such as an address mapping operation, a wear-leveling operation, a garbage collection operation, or the like. The address mapping operation may be an operation of converting a logical address received from the host device into a physical address used to actually store data in a nonvolatile memory. The wear-leveling operation may be a technique for preventing excessive deterioration of a specific block by allowing blocks of the nonvolatile memory to be uniformly used. As an example, the wear-leveling operation may be implemented using a firmware technique that balances erase counts of physical blocks. The garbage collection operation may be a technique for ensuring usable capacity in the nonvolatile memory by erasing an existing block after copying valid data of the existing block to a new block.

The ECC engine 440 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The routing registration module 450 may store the backup storage information BSI associated with the backup storage device. For example, the backup storage information BSI may include network address information associated with the backup storage device, and a location of the backup storage device 300 on the network may be checked using the backup storage information BSI. For example, a relationship between the first data DAT and the backup storage information BSI may be recorded in the form of a mapping table. For example, such information (e.g., the mapping table) may be stored in at least one of the plurality of storage regions, and may be read and utilized when the storage device 200 is rebooted or powered on or off.

When the unrecoverable data failure has occurred on the first data DAT, the data management module 460 may collect first information (e.g., failed or damaged data information) FDI associated with the first data DAT, and may provide the first information FDI to the routing registration module 450. The routing registration module 450 may search the backup storage information BSI based on the first information FDI. For example, the first information FDI may include at least one of address information of the first data DAT and information of a first storage region in which the first data DAT is stored.

The discovery module 470 may store storage information SI associated with the storage device 200. For example, as with the backup storage information BSI, the storage information SI may include network address information associated with the storage device 200.

The recovery module 490 may generate a packet (e.g., a read command packet RCMD_PKT in FIG. 11) based on the backup storage information BSI, the first information FDI and the storage information SI, and may provide the packet to the network interface 410. When the reception of the backup data BDAT is completed, the recovery module 490 may notify the reception completion to the data management module 460 and may perform a data recovery operation. In this regard, the recovery module 490 may generally manage and/or control operations associated with the method of recovering data in the storage device according to example embodiments.

In some example embodiments, at least a part of the routing registration module 450, the data management module 460, the discovery module 470 and the recovery module 490 may be implemented as hardware. For example, at least a part of the routing registration module 450, the data management module 460, the discovery module 470 and the recovery module 490 may be included in a computer-based electronic system. In other example embodiments, at least a part of the routing registration module 450, the data management module 460, the discovery module 470 and the recovery module 490 may be implemented as instruction codes or program routines (e.g., a software program). For example, the instruction codes or the program routines may be executed by a computer-based electronic system, and may be stored in any storage device located inside or outside the computer-based electronic system. A configuration including the network interface 410, the routing registration module 450, the data management module 460, the discovery module 470 and the recovery module 490 may be referred to as a network agent.

The storage controller 400 may further include an advanced encryption standard (AES) engine for data encryption/decryption, and/or the like.

Figure 4:
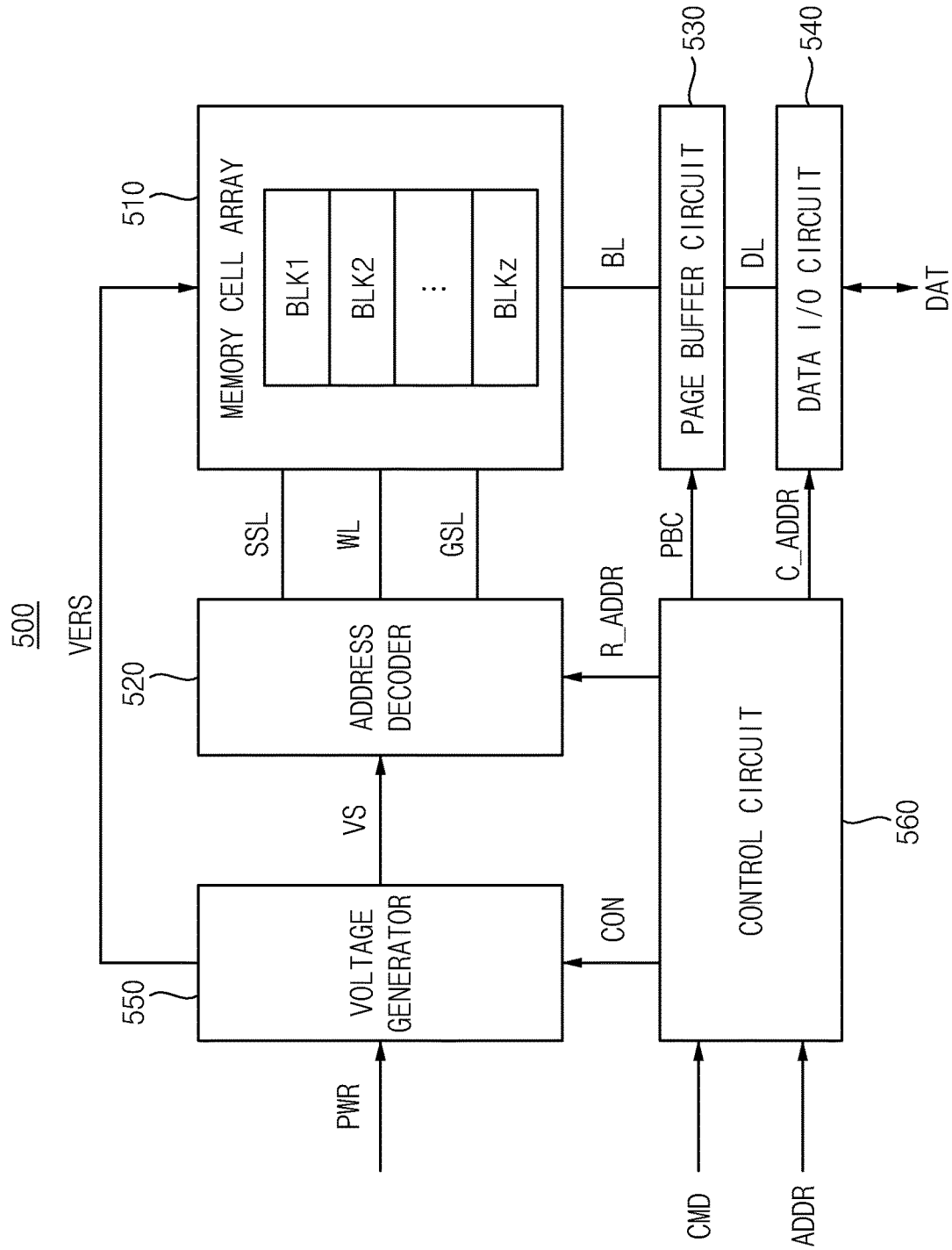
FIG. 4 is a block diagram illustrating a nonvolatile memory according to example embodiments.

FIG. 4 is a block diagram illustrating an example of a nonvolatile memory, which may be included in a storage device, according to example embodiments.

Referring to FIG. 4, a nonvolatile memory 500 may include a memory cell array 510, an address decoder 520, a page buffer circuit 530, a data input/output (I/O) circuit 540, a voltage generator 550 and a control circuit 560. One storage region may be formed or provided by one or more nonvolatile memories.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1 to BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may include a charge trap layer.

The control circuit 560 may receive a command CMD and an address ADDR (e.g., from the storage controller 210 in FIG. 2), and may control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 560 may generate control signals CON, which are used for controlling the voltage generator 550, may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers. The page buffer circuit 530 may store data DAT to be programmed into the memory cell array 510 or may store read data DAT sensed from the memory cell array 510. In this regard, the page buffer circuit 530 may operate as a write driver or a sensing amplifier depending on an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory included in the storage device according to example embodiments is described based on a NAND flash memory, the nonvolatile memory according to example embodiments may be any nonvolatile memory, e.g., a PRAM, a RRAM, a NFGM, a PoRAM, a MRAM, a FRAM, or the like.

Figure 5A:
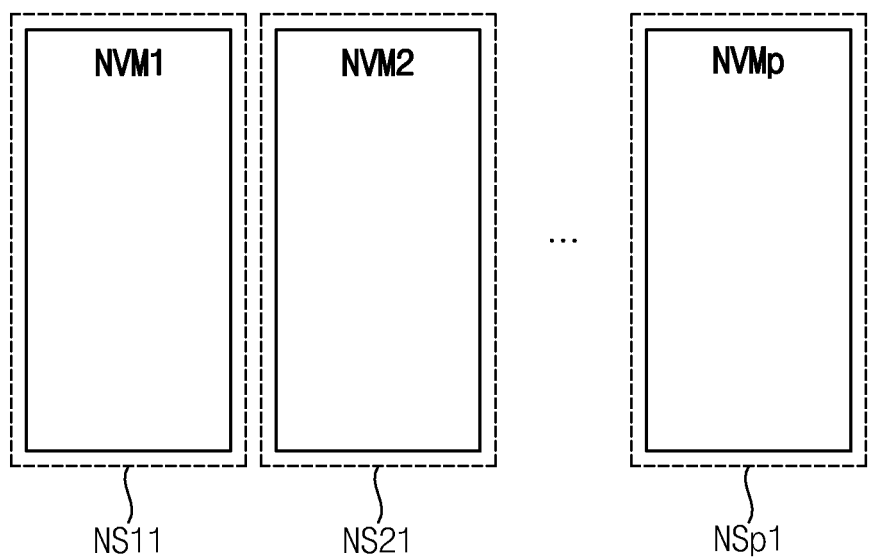
FIGS. 5A, 5B and 5C are diagrams for describing namespaces set on nonvolatile memories according to example embodiments.
Figure 5B:
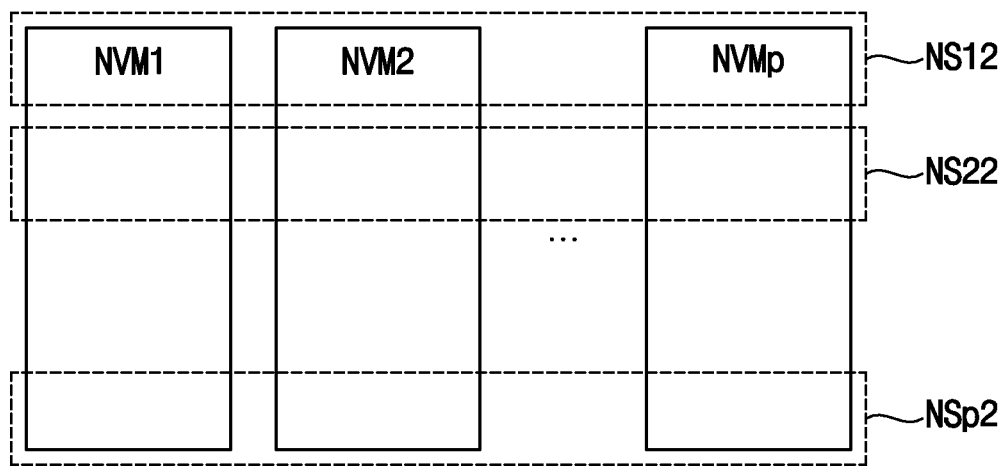
Figure 5C:
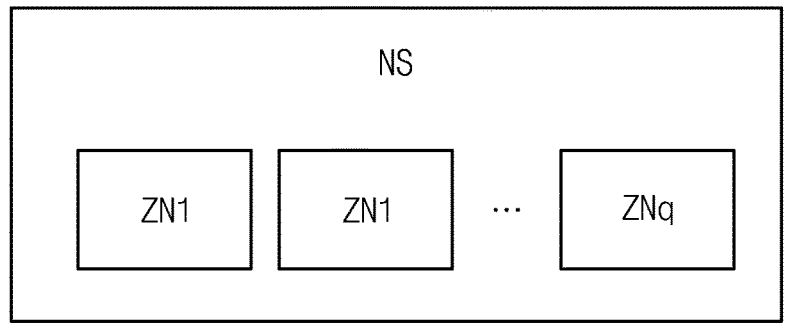

FIGS. 5A, 5B and 5C are diagrams for describing namespaces set on nonvolatile memories, such as those included in a storage device, according to example embodiments.

The storage device according to example embodiments may operate based on a nonvolatile memory express (NVMe) protocol, and may support a namespace function and/or a zoned namespace (ZNS) function. The NVMe may be an interface of a register level that performs communication between a storage device such as a solid state drive (SSD) and host software. The NVMe may be based on a peripheral component interconnect express (PCIe) bus or a compute express link (CXL) bus, and may be an interface designed for or optimized for a SSD. When the namespace function is used, a storage device implemented with one physical device may be partitioned into a plurality of logical devices (e.g., a plurality of namespaces), and data may be managed based on the plurality of namespaces. When the zoned namespace function is used, one namespace may be additionally partitioned into a plurality of zones, and data may be managed based on the plurality of namespaces and the plurality of zones. All of the plurality of namespaces and the plurality of zones may be physically included in the same storage device, and each namespace and each zone may be used as a separate storage space.

Referring to FIG. 5A, an example of generating and setting a plurality of namespaces NS11, NS21, . . . , NSp1 on a plurality of nonvolatile memories NVM1, NVM2, . . . , NVMp is illustrated, where p is a natural number greater than or equal to two. For example, the plurality of nonvolatile memories NVM1 to NVMp may be included in one storage device, and thus the plurality of namespaces NS11 to NSp1 may also be included in one storage device.

In an example, as shown in FIG. 5A, one namespace may be generated and set on one nonvolatile memory. For example, the namespace NS11 may be generated and set on the entire region of the nonvolatile memory NVM1, the namespace NS21 may be generated and set on the entire region of the nonvolatile memory NVM2 and the namespace NSp1 may be generated and set on the entire region of the nonvolatile memory NVMp.

Referring to FIG. 5B, another example of generating and setting a plurality of namespaces NS12, NS22, . . . , NSp2 on a plurality of nonvolatile memories NVM1, NVM2, . . . , NVMp is illustrated. The descriptions repeated with FIG. 5A will be omitted.

In an example, as shown in FIG. 5B, one namespace may be generated and set on all of the plurality of nonvolatile memories NVM1 to NVMp. For example, the namespace NS12 may be generated and set on some regions of all of the plurality of nonvolatile memories NVM1 to NVMp, the namespace NS22 may be generated and set on some regions of all of the plurality of nonvolatile memories NVM1 to NVMp, and the namespace NSp2 may be generated and set on some regions of all of the plurality of nonvolatile memories NVM1 to NVMp.

The operation of generating and setting the namespaces may be variously implemented according to example embodiments. For example, the capacities of the namespaces NS11 to NSp1 and NS12 to NSp2 may be substantially equal to or different from each other. For example, the number of namespaces NS11 to NSp1 and NS12 to NSp2 and the number of nonvolatile memories NVM1 to NVMp may be substantially equal to or different from each other.

Referring to FIG. 5C, an example of generating and setting a plurality of zones ZN1, ZN2, . . . , ZNq on one namespace NS is illustrated, where q is a natural number greater than or equal to two. The namespace NS may correspond to one of the namespaces NS11 to NSp1 in FIG. 5A and the namespaces NS12 to NSp2 in FIG. 5B.

In some example embodiments, the operation of generating and setting the namespaces and/or the zones may be performed in advance at an initial operation time. In other example embodiments, the operation of generating and setting the namespaces and/or the zones may be performed in real-time or during runtime.

Figure 6:
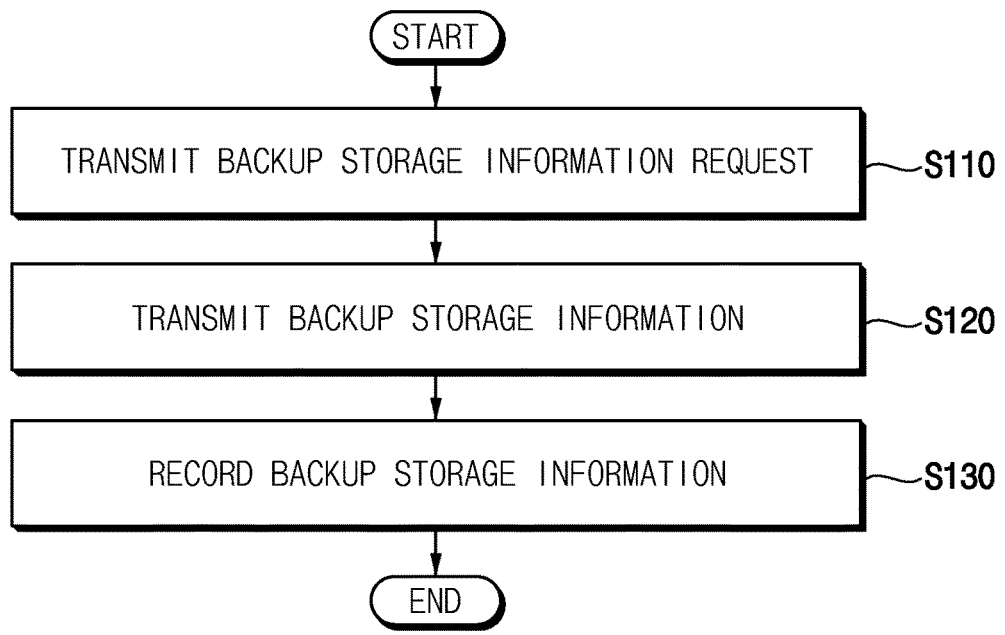
FIG. 6 is a flowchart illustrating receiving backup storage information according to example embodiments.
Figure 7:
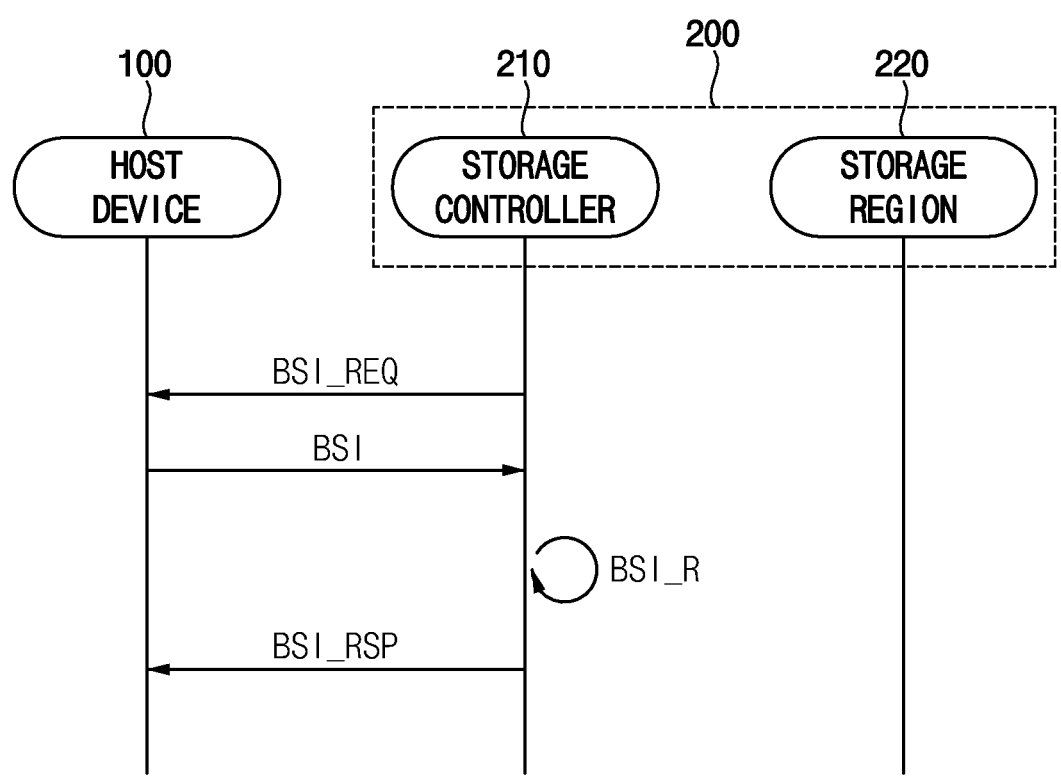
FIG. 7 is a diagram for receiving backup storage information according to example embodiments.

FIG. 6 is a flowchart illustrating receiving backup storage information according to example embodiments. FIG. 7 is a diagram for describing an operation of FIG. 6.

Referring to FIGS. 1, 6 and 7, to receive the backup storage information (operation S100), the storage device 200 may transmit a backup storage information request BSI_REQ to the host device 100 (operation S110). For example, the storage controller 210 may generate the backup storage information request BSI_REQ, and may output the backup storage information request BSI_REQ through the network 150. The network 150 may be formed between the host device 100 and the storage controller 210, as described with reference to FIG. 2. For example, operation S110 may be performed by the network interface 410 in FIG. 3.

In response to the backup storage information request BSI_REQ, the host device 100 may transmit the backup storage information BSI to the storage device 200 (operation S120). For example, the storage controller 210 may receive the backup storage information BSI through the network 150. For example, the backup storage information BSI may be received by the network interface 410 in FIG. 3.

In some example embodiments, the backup storage information BSI may include network address information associated with the backup storage device 300. For example, in the NVMe protocol, the backup storage information BSI may include an NVMe qualified name (NQN). For another example, in the iSCSI protocol, the backup storage information BSI may include an iSCSI qualified name (IQN). However, example embodiments are not limited thereto, and the backup storage information BSI may further include meta data, and/or the like.

The storage device 200 may record the backup storage information BSI (operation S130). For example, the storage controller 210 may perform a backup storage information recording operation BSI_R. For example, a relationship (or correspondence) between the first data DAT and the backup storage information BSI associated with the backup storage device 300 in which the backup data BDAT corresponding to the first data DAT is stored may be recorded. For example, operation S130 may be performed by the routing registration module 450 in FIG. 3.

Thereafter, the storage device 200 (e.g., the storage controller 210) may transmit a backup storage information recording completion response BSI_RSP to the host device 100.

In some example embodiments, the operations in FIG. 7 may be periodically performed, and information changed by the periodic operations may be stored into the nonvolatile memory included in the storage device 200.

Figure 8:
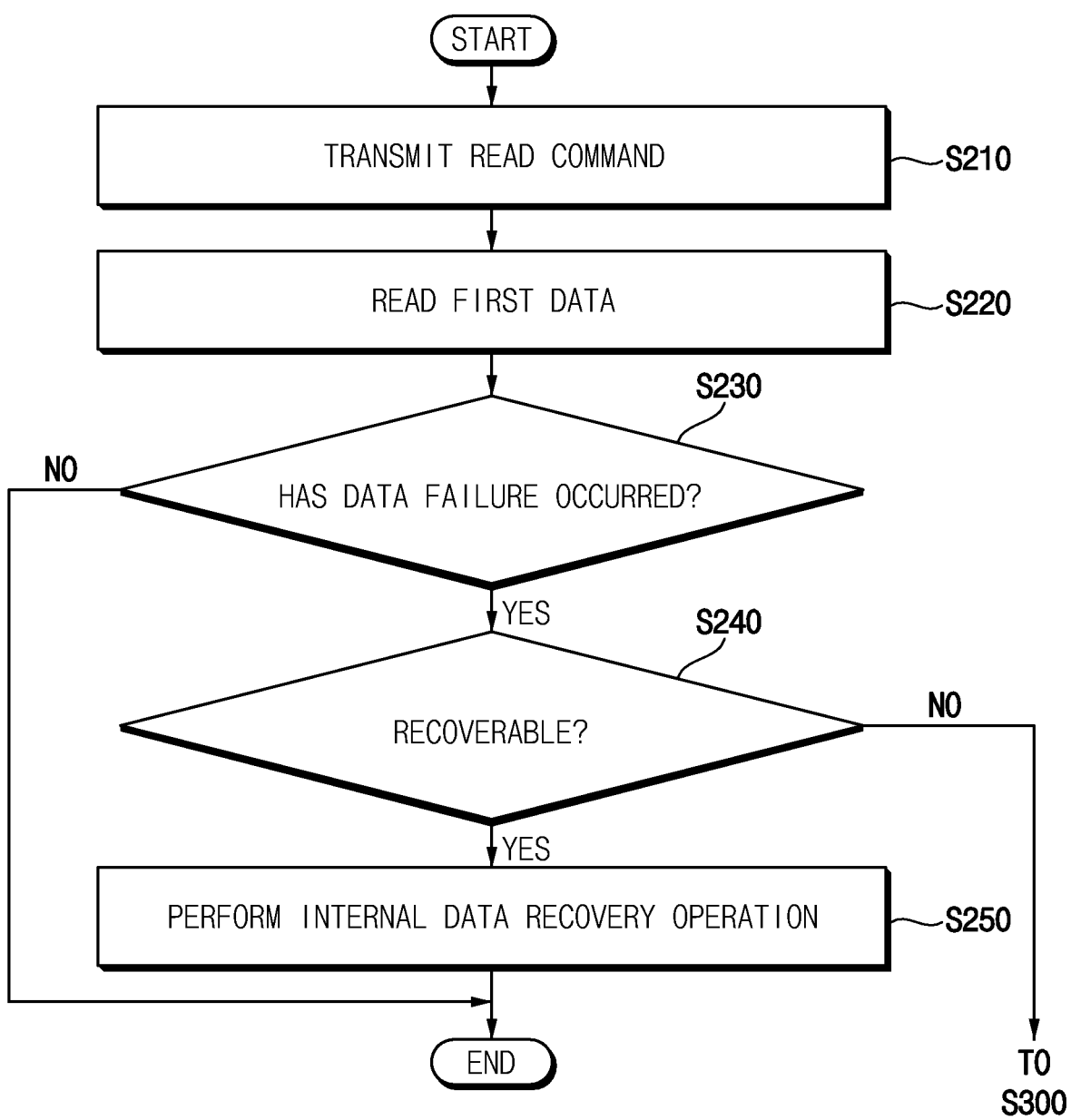
FIG. 8 is a flowchart illustrating performing a data read operation on first data according to example embodiments.
Figure 9A:
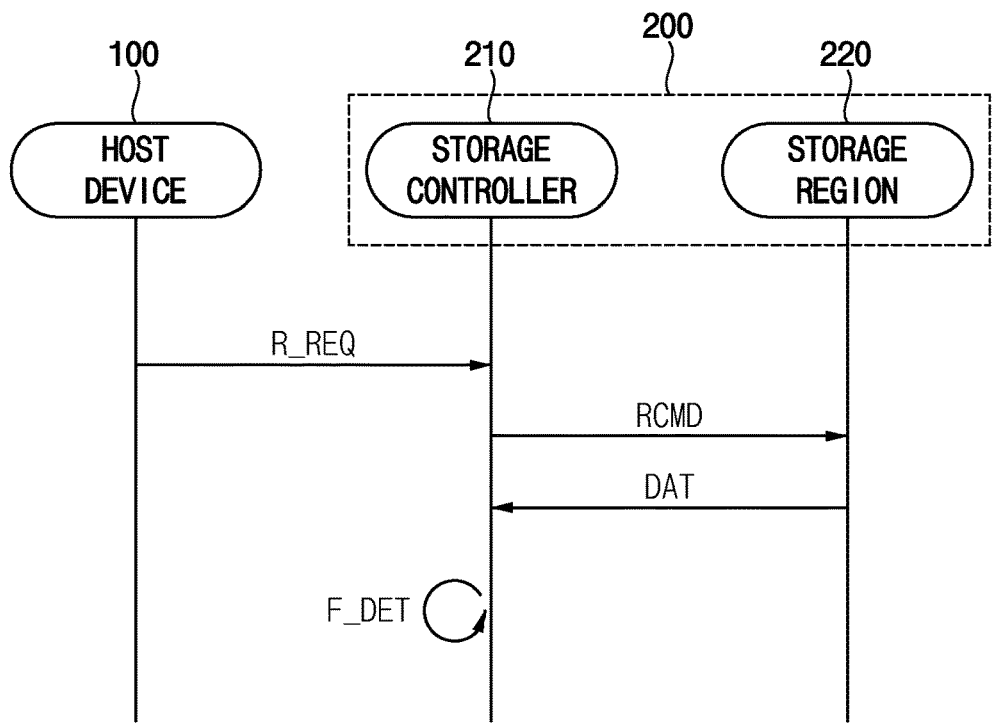
FIGS. 9A, 9B and 9C are diagrams for describing performing a data read operation on first data according to example embodiments.
Figure 9B:
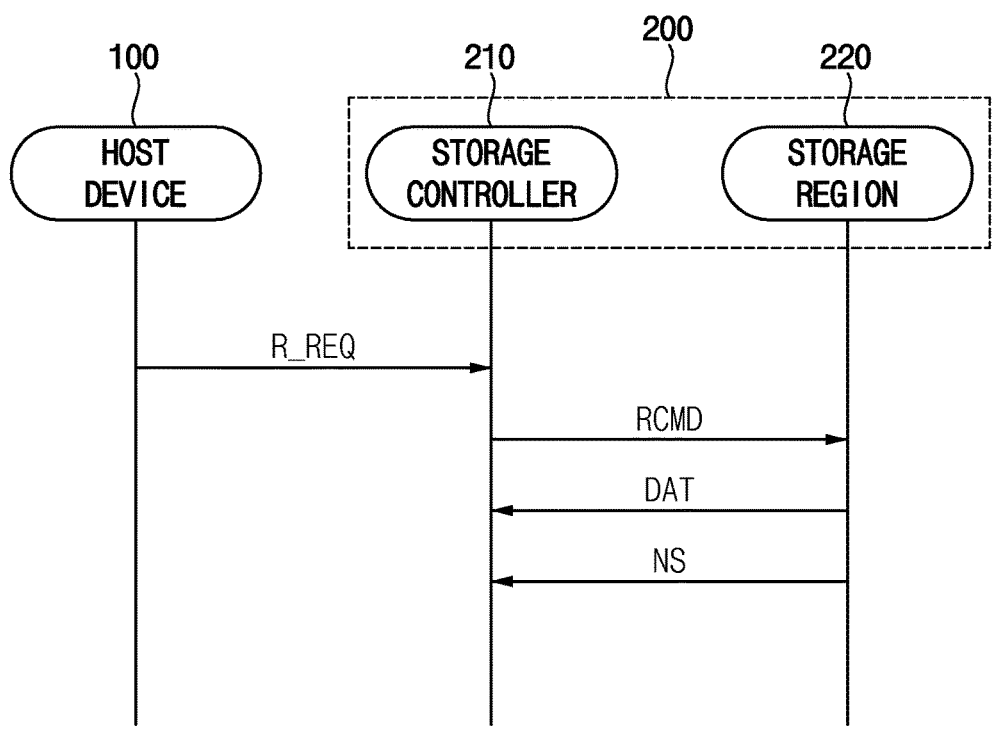
Figure 9C:
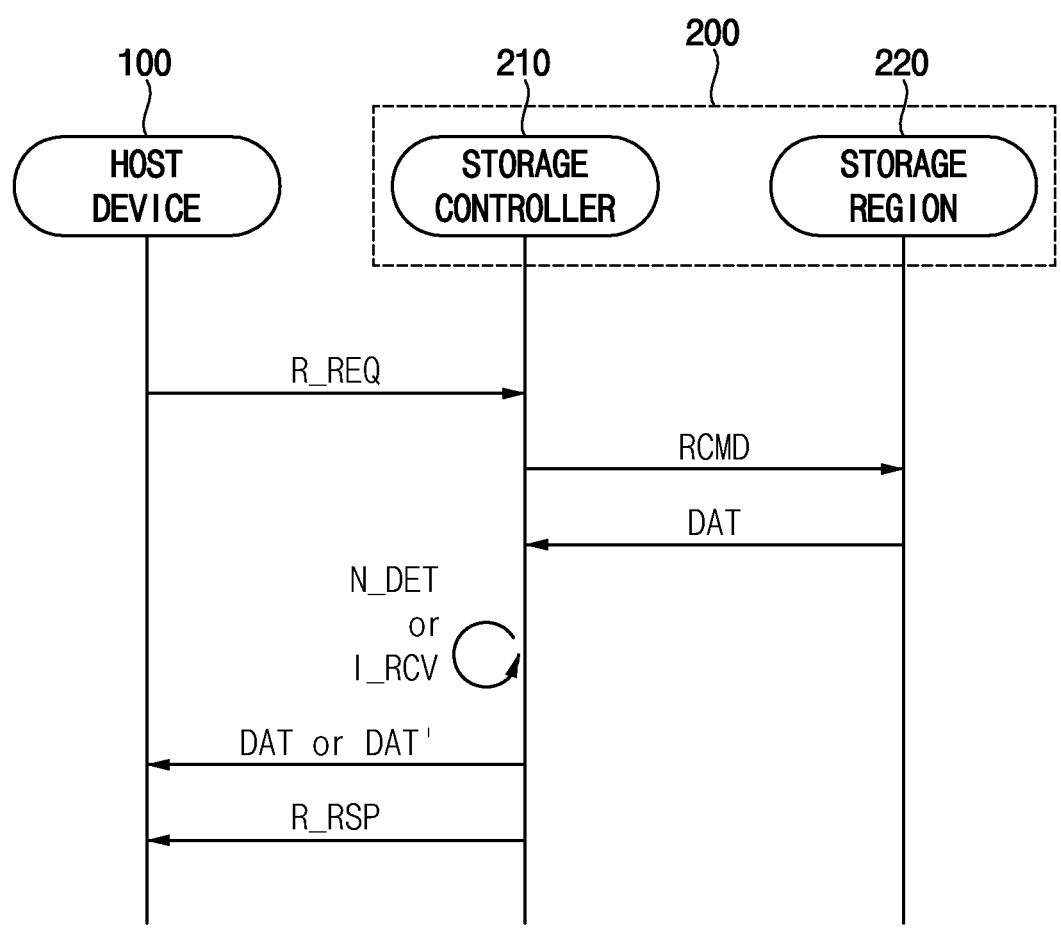

FIG. 8 is a flowchart illustrating performing a data read operation on first data according to example embodiments. FIGS. 9A, 9B and 9C are diagrams for describing an operation of FIG. 8.

Referring to FIGS. 1, 8, 9A, 9B and 9C, to perform the data read operation on the first data (operation S200), the host device 100 may transmit a read request R_REQ to the storage device 200. FIGS. 9A, 9B and 9C illustrate that the data read operation is performed based on the read request R_REQ from the host device 100, but example embodiments are not limited thereto. For example, the data read operation may be performed based on a read request from an external device other than the host device 100. For another example, the data read operation may be internally performed by the storage device 200 itself without a read request being received from the outside (e.g., by executing prevention codes or defense codes, etc.).

Thereafter, the storage controller 210 may transmit a read command RCMD to a storage region 220 that is included in the storage device 200 and stores the first data DAT (operation S210). The first data DAT may be read or retrieved from the storage region 220 based on the read command RCMD (operation S220). The first data DAT may be transmitted from the storage region 220 to the storage controller 210. For example, operations S210 and S220 may be performed by the nonvolatile memory interface 480 in FIG. 3.

The storage device 200 may check or determine whether the unrecoverable data failure exists on the first data DAT. For example, it may be determined whether a data failure (or error) has occurred on the first data DAT (operation S230). When the data failure has occurred on the first data DAT (operation S230: YES), it may be determined whether the data failure is recoverable (operation S240). When the data failure is unrecoverable (operation S240: NO), e.g., when it is determined that the unrecoverable data failure has occurred, operation S300 may be performed.

In some example embodiments, operations S230 and S240 may be performed by the storage controller 210. For example, as illustrated in FIG. 9A, after the first data DAT is received, the storage controller 210 may perform an operation F_DET of detecting the unrecoverable data failure included in the first data DAT. In this example, operations S230 and S240 may be performed by the ECC engine 440 in FIG. 3.

In other example embodiments, operations S230 and S240 may be performed by the storage region 220, e.g., by the nonvolatile memory. For example, as illustrated in FIG. 9B, after the first data DAT is received, the storage controller 210 may receive a first notification signal NS, which represents that the first data DAT includes the unrecoverable data failure, from the storage region 220. In this regard, information whether the first data DAT includes the unrecoverable data failure may be notified from the storage region 220. In this example, the nonvolatile memory (e.g., the nonvolatile memory 500 of FIG. 4) corresponding to the storage region 220 may include an on-die (or on-chip) ECC engine that internally performs ECC encoding and ECC decoding, and operations S230 and S240 may be performed by the on-die ECC engine included in the nonvolatile memory 500. For example, the above-described operations may be performed based on an erasure coding scheme, a Redundant Array of Independent Disks (RAID) 5 scheme, a RAID 6 scheme, or the like.

When the data failure has not occurred on the first data DAT (operation S230: NO), the storage device 200 (e.g., the storage controller 210) may transmit the first data DAT to the host device 100 based on an operation N_DET in which the data failure is not detected.

When the data failure has occurred on the first data DAT (operation S230: YES), and when the data failure is recoverable (operation S240: YES), e.g., when it is determined that a recoverable data failure has occurred, the storage device 200 (e.g., the storage controller 210) may perform an internal data recovery operation I_RCV on the first data DAT (operation S250), and may transmit recovered or restored first data DAT' to the host device 100. For example, as illustrated in FIG. 9C, operation S250 may be performed by the ECC engine 440 in FIG. 3. For another example, operation S250 may be performed by the on-die ECC engine included in the nonvolatile memory.

Thereafter, the storage device 200 (e.g., the storage controller 210) may transmit a read completion response R_RSP to the host device 100.

Figure 11:
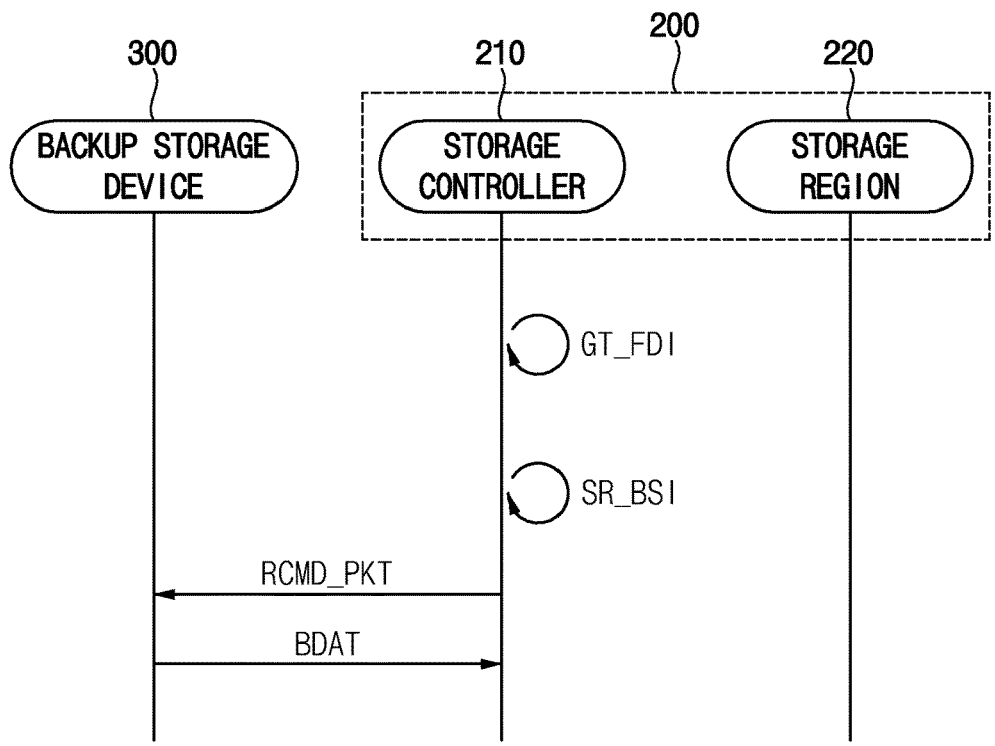
FIG. 11 is a diagram for describing directly receiving backup data according to example embodiments.

FIG. 10 is a flowchart illustrating directly receiving backup data according to example embodiments. FIG. 11 is a diagram for describing an operation of FIG. 10.

Referring to FIGS. 1, 10 and 11, when directly receiving the backup data (operation S300), the storage device 200 may collect or gather the first information FDI associated with the first data DAT on which the unrecoverable data failure has occurred (operation S310). For example, the storage controller 210 may perform an operation GT_FDI of collecting the first information FDI. For example, operation S310 may be performed by the data management module 460 in FIG. 3, and the first information FDI may be provided to the routing registration module 450 in FIG. 3.

In some example embodiments, the first information FDI may include at least one of address information of the first data DAT and information of the storage region 220 in which the first data DAT is stored. For example, the first information FDI may include logical address information (e.g., logical block address (LBA)), namespace information, zone information, NVM set information, endurance group information, volume or logical unit number (LUN) information, etc. However, example embodiments are not limited thereto, and the first information FDI may further include at least one of various information.

Namespaces and zones may be implemented as described with reference to FIGS. 5A, 5B and 5C, and may represent a set of LBAs accessible by host software.

An NVM set may represent a concept where one or more namespaces and a space that is not allocated as a namespace are handled as one set. One namespace may not be included in more than one NVM set. A group of multiple NVM sets may be referred to as NVM sets.

An endurance group may represent a concept where NVM sets are handled as one group to increase performance and lifespan. For example, assuming that there is an endurance group including triple-level cells (TLCs) and an endurance group including single-level cells (SLCs). It may be efficient that a service for requiring high performance is provided using the endurance group including SLCs and a service for requiring large capacity rather than high performance is provided using the endurance group including TLCs. In addition, when the wear-leveling operation is applied to increase the lifespan, the wear-leveling operation may be performed for each endurance group, and thus the efficient wear-leveling may be performed.

A LUN may represent a logical volume in a storage device. For example, the LUN may be a unique identifier for designating an individual or collection of physical or virtual storage devices that execute input/output (I/O) commands with a host device, as defined by small computer system interface (SCSI) standard.

The storage device 200 may search or retrieve the backup storage information BSI based on the first information FDI (operation S320). For example, the storage controller 210 may perform an operation SR_BSI of searching for the backup storage information BSI. For example, operation S320 may be performed by the routing registration module 450 in FIG. 3. The backup storage information BSI may be accurately and efficiently searched using the above-described various information associated with the first data DAT.

The storage device 200 may directly transmit a read command packet RCMD_PKT for reading the backup data BDAT to the backup storage device 300 (operation S330). For example, the storage controller 210 may generate the read command packet RCMD_PKT, and may output the read command packet RCMD_PKT through the network 150. The network 150 may be formed between the backup storage device 300 and the storage controller 210, as described with reference to FIG. 2. For example, operation S330 may be performed by the network interface 410 in FIG. 3.

In response to the read command packet RCMD_PKT, the backup storage device 300 may directly transmit the backup data BDAT to the storage device 200 (operation S340). For example, the storage controller 210 may receive the backup data BDAT through the network 150. For example, the backup data BDAT may be received by the network interface 410 in FIG. 3.

In some example embodiments, when the storage device 200 operates based on the NVMe-oF, operations S330 and S340 may be performed through the network interface 410, e.g., using the RDMA based on the NVMe-oF.

In the method of recovering data in the storage device according to example embodiments, the storage device 200 may not transmit a request for receiving the backup data BDAT to the host device 100, and thus operations S310, S320, S330 and S340 may be performed without the intervention of the host device 100. The host device 100 may not recognize the data failure occurred in the storage device 200, and thus the performance may not be degraded and there may be minimal additional latency as compared to normal operation. Accordingly, the overhead of the host device 100 may be reduced, the bandwidth of the network 150 may be improved, and the storage device 200 may be utilized with the maximum output and/or performance.

Figure 12:
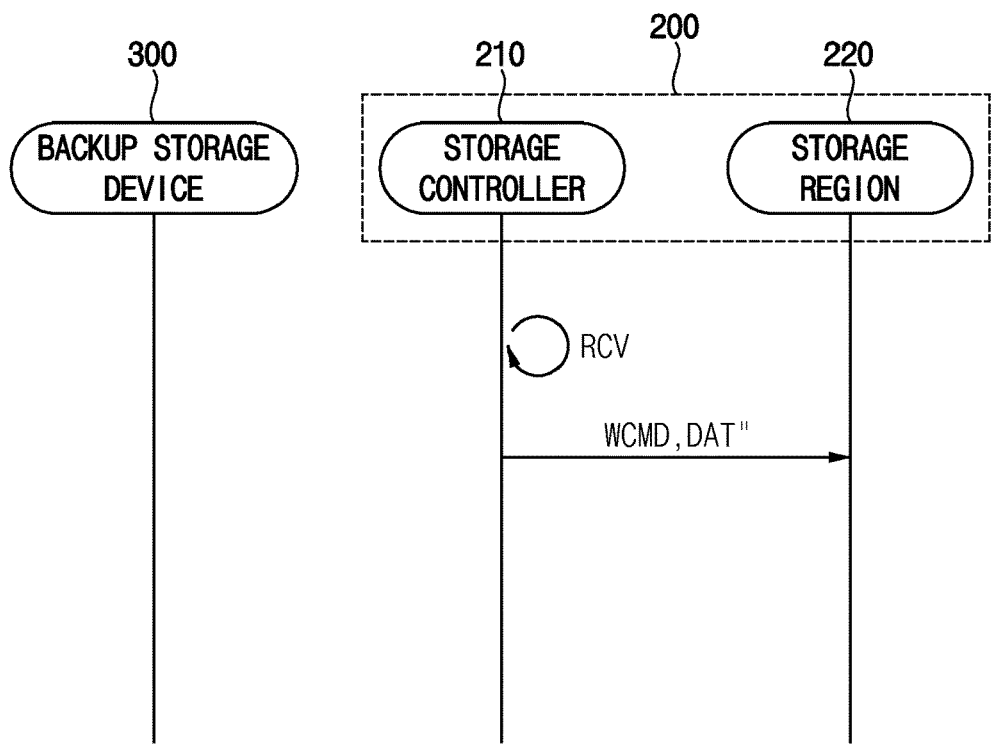
FIG. 12 is a diagram for describing a data recovery operation according to example embodiments.

FIG. 12 is a diagram for describing a data recovery operation according to example embodiments.

Referring to FIGS. 1 and 12, when performing the data recovery operation (operation S400), the storage device 200 (e.g., the storage controller 210) may perform a data recovery operation RCV on the first data DAT based on the backup data BDAT. For example, the data recovery operation RCV may include an operation of copying and storing the backup data BDAT, operations based on cyclic redundancy code (CRC), ECC, RAID, erasure coding, and/or the like. The backup data BDAT may correspond to recovered first data DAT. For example, at least some of the above-described operations may be processed on the flash translation layer.

Thereafter, the storage device 200 may store the recovered first data DAT". For example, the storage controller 210 may transmits the write command WCMD and the recovered first data DAT" to the storage region 220, and the storage region 220 may store the recovered first data DAT" based on the write command WCMD.

Figure 13:
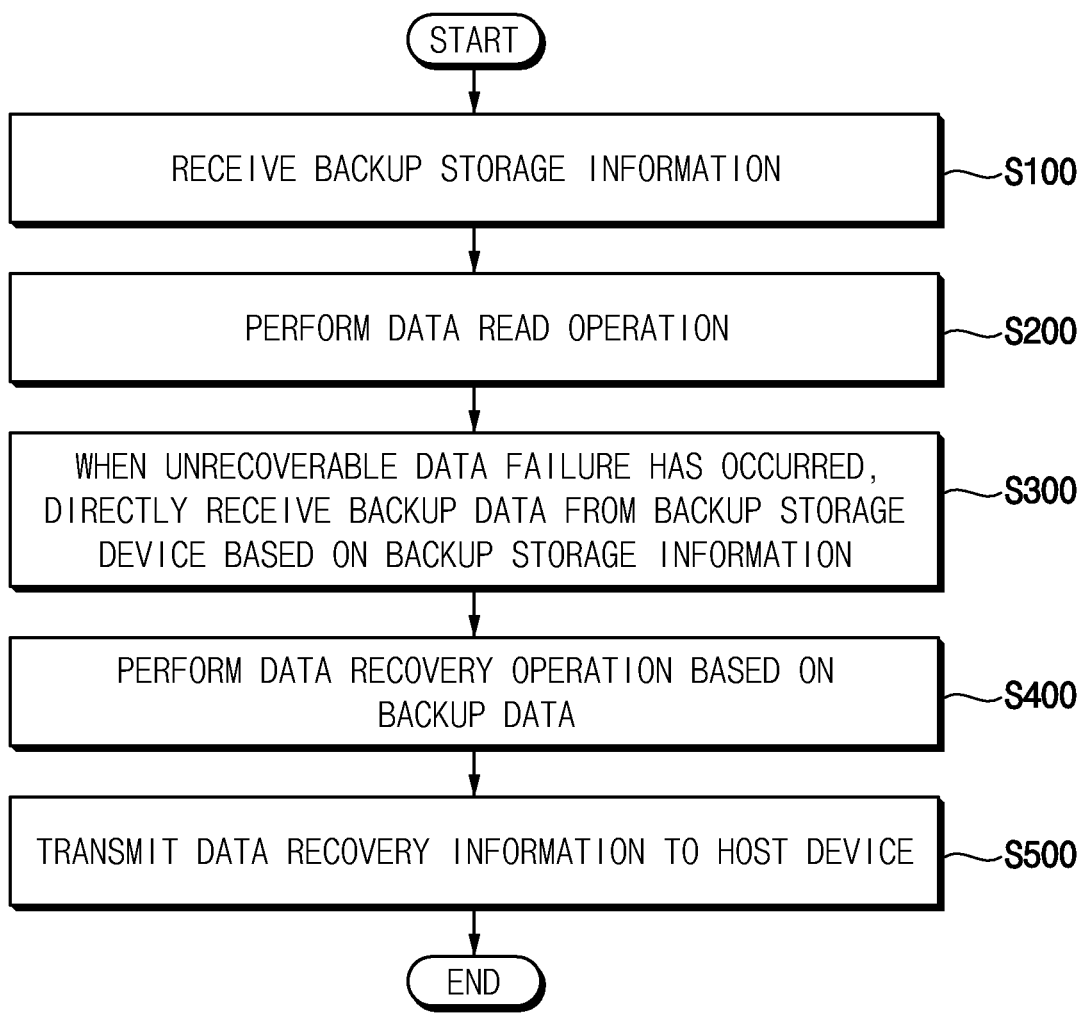
FIG. 13 is a flowchart illustrating a method of recovering data in a storage device according to example embodiments.
Figure 14:
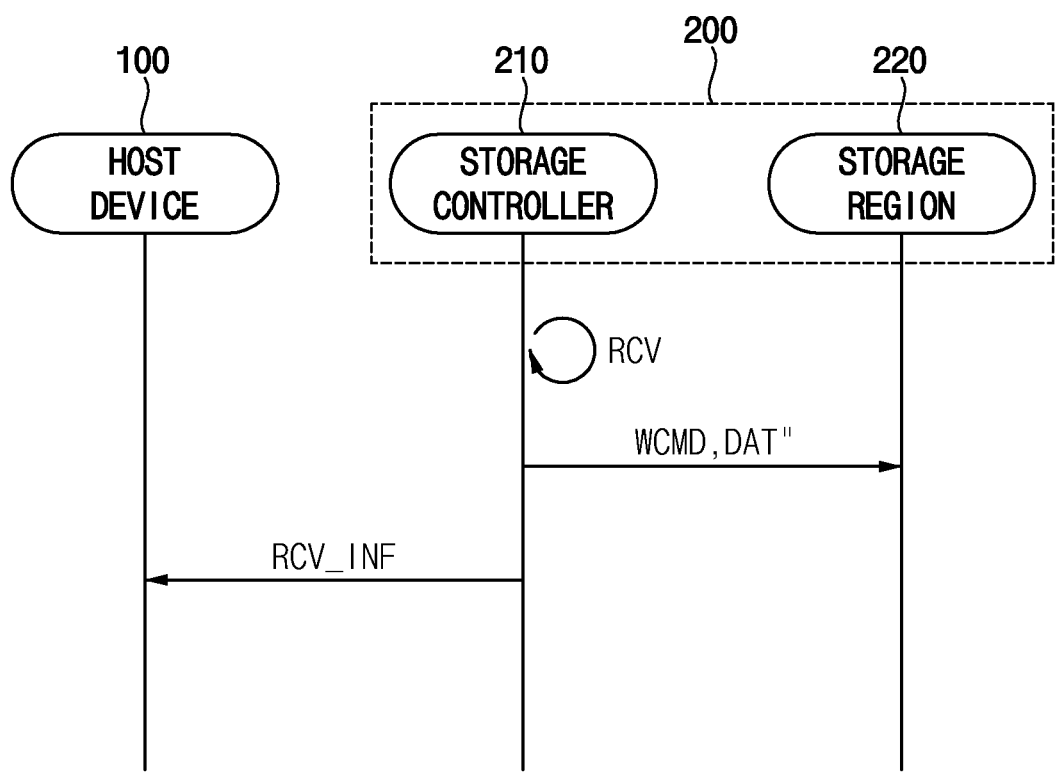
FIG. 14 is a diagram for describing recovering data in a storage device according to example embodiments.

FIG. 13 is a flowchart illustrating a method of recovering data in a storage device according to example embodiments. FIG. 14 is a diagram for describing an operation of FIG. 13. The descriptions repeated with FIGS. 1 and 12 will be omitted.

Referring to FIGS. 13 and 14, in a method of recovering data in a storage device according to example embodiments, operations S100, S200, S300 and S400 may be substantially the same as those described with reference to FIG. 1. For example, operations S100, S200, S300 and S400 may be performed as described with reference to FIGS. 6 through 12. Operation S800 in FIG. 1 may be performed after operation S400.

Data recovery information associated with the first data may be transmitted to the host device (operation S500). For example, the storage device 200 (e.g., the storage controller 210) may generate data recovery information RCV_INF, and may output the data recovery information RCV_INF through the network 150. For example, operation S500 may be performed by the network interface 410, the routing registration module 450 and the data management module 460 in FIG. 3.

As described above, even if operation S300 is performed without the intervention of the host device 100 and the host device 100 does not recognize the data failure occurred in the storage device 200, the storage device 200 may notify the host device 100 that the data recovery operation is performed on the first data DAT, and thus the storage device 200 may help or assist in the data management of the host device 100. In this regard, the host device 100 may receive the data recovery information RCV_INF associated with the first data DAT even if the host device 100 does not receive a request for providing the backup data BDAT and/or a data recovery request for the first data DAT.

Figure 15:
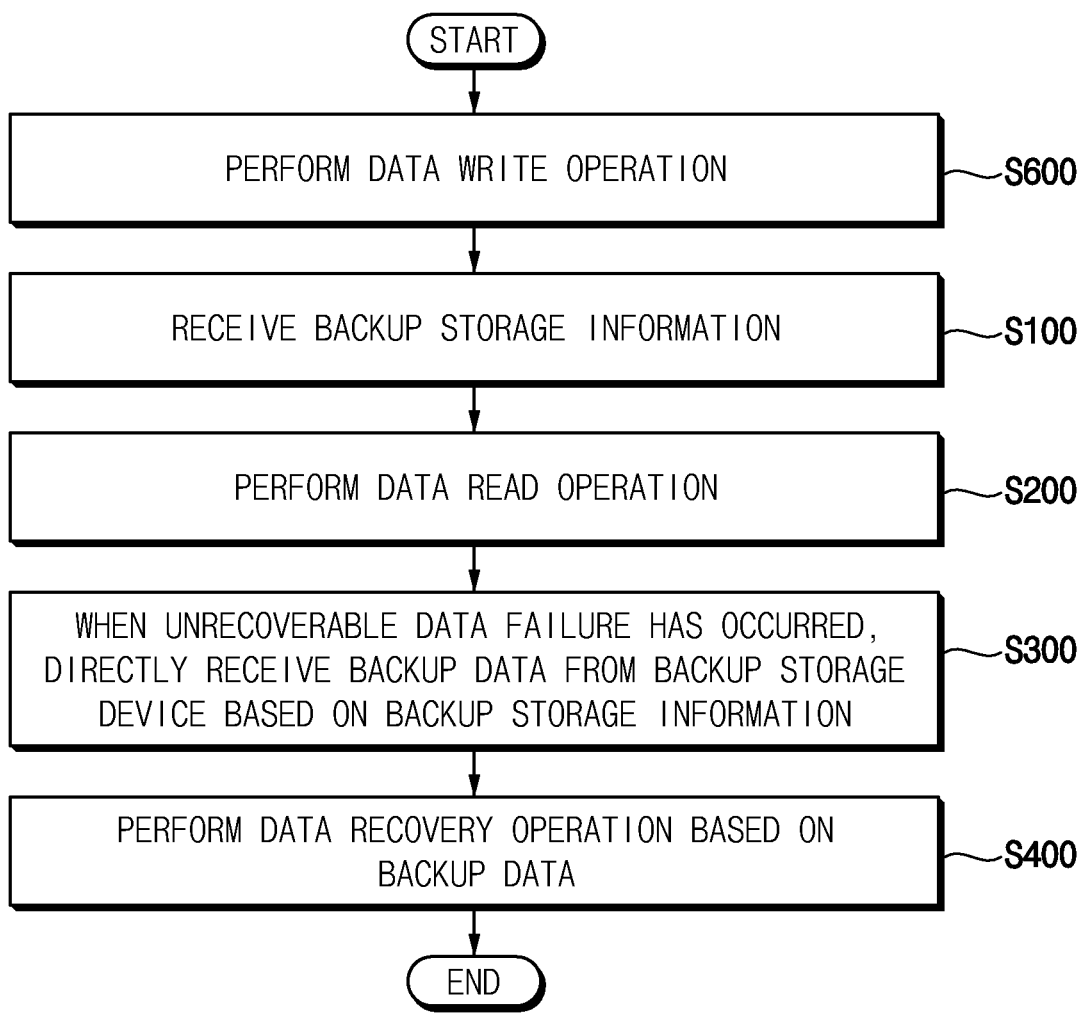
FIG. 15 is a flowchart illustrating a method of recovering data in a storage device according to example embodiments.
Figure 16:
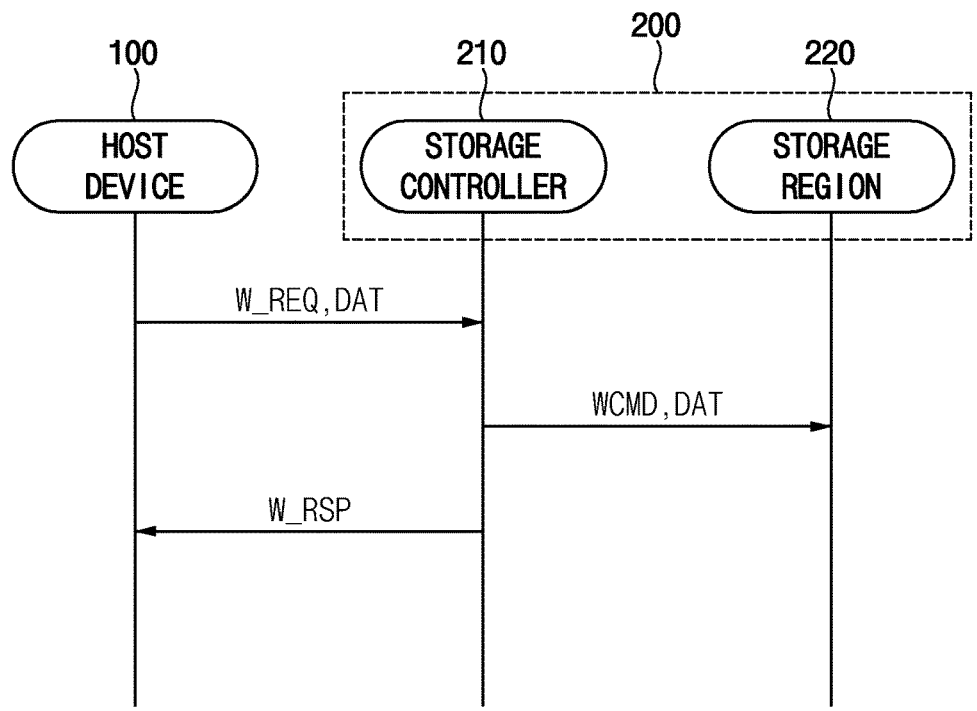
FIGS. 16 and 17 are diagrams for describing recovering data in a storage device according to example embodiments.
Figure 17:
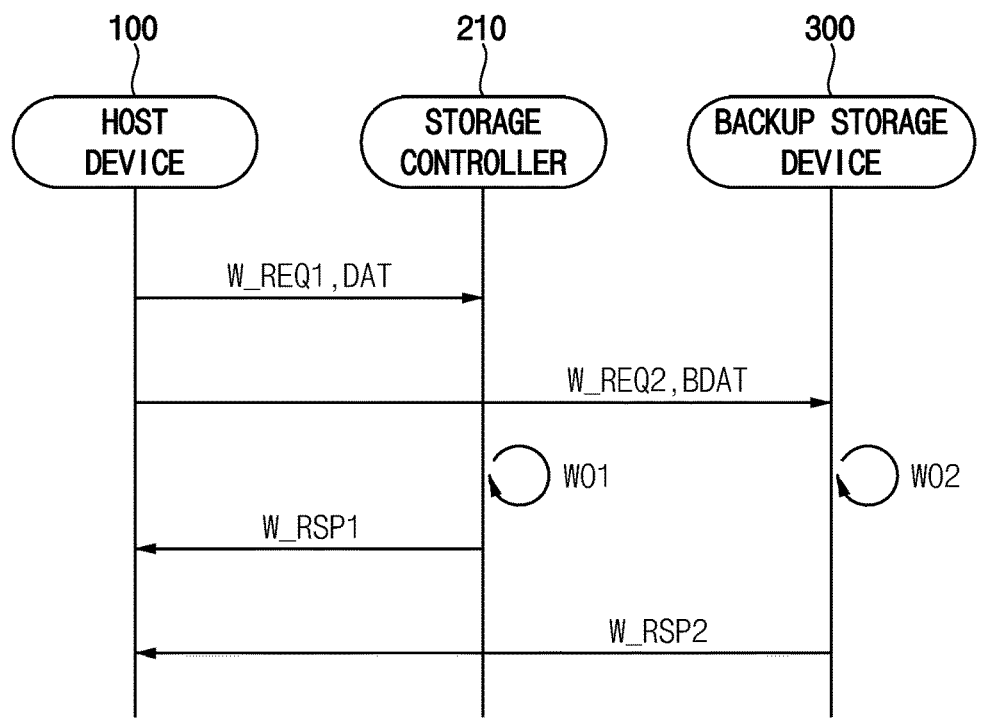

FIG. 15 is a flowchart illustrating a method of recovering data in a storage device according to example embodiments. FIGS. 16 and 17 are diagrams for describing an operation of FIG. 15. The descriptions repeated with FIG. 1 will be omitted.

Referring to FIGS. 15, 16 and 17, in a method of recovering data in a storage device according to example embodiments, before operations S100, S200, S300 and S400 are performed, a data write operation may be performed on or for the first data (operation S600). For example, as illustrated in FIG. 16, the host device 100 may transmit a write request W_REQ and the first data DAT to the storage device 200 (e.g., to the storage controller 210), the storage controller 210 may transmit a write command WCMD and the first data DAT to the storage region 220, and the storage region 220 may store the first data DAT based on the write command WCMD. Thereafter, the storage device 200 (e.g., the storage controller 210) may transmit a write completion response W_RSP to the host device 100.

In some example embodiments, an operation of receiving the backup storage information from the host device and the data write operation on the first data may be performed together, and the operation of receiving the backup storage information from the host device may be performed while the data write operation is performed on the first data. In this regard, operation S100 may be a process performed together during the data write operation, and for example, operations S600 and S100 may be substantially simultaneously or concurrently performed.

In some example embodiments, a data replication operation in which the backup data is stored into the backup storage device and the data write operation on the first data may be performed together, and the data replication operation may be performed while the data write operation is performed on the first data. For example, as illustrated in FIG. 17, the host device 100 may transmit a first write request W_REQ1 and the first data DAT to the storage device 200, and may also transmit a second write request W_REQ2 and the backup data BDAT to the backup storage device 300. The storage device 200 may perform a first data write operation WO1 on the first data DAT, and may transmit a first write completion response W_RSP1 to the host device 100. The backup storage device 300 may perform a second data write operation WO2 on the backup data BDAT, and may transmit a second write completion response W_RSP2 to the host device 100. In this regard, the data replication and/or backup operations may be performed together during the data write operation.

Operations S100, S200, S300 and S400 that are performed after operation S600 may be substantially the same as those described with reference to FIG. 1. For example, operations S100, S200, S300 and S400 may be performed as described with reference to FIGS. 6 through 12. Operation S800 in FIG. 1 may be performed after operation S400.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 18:
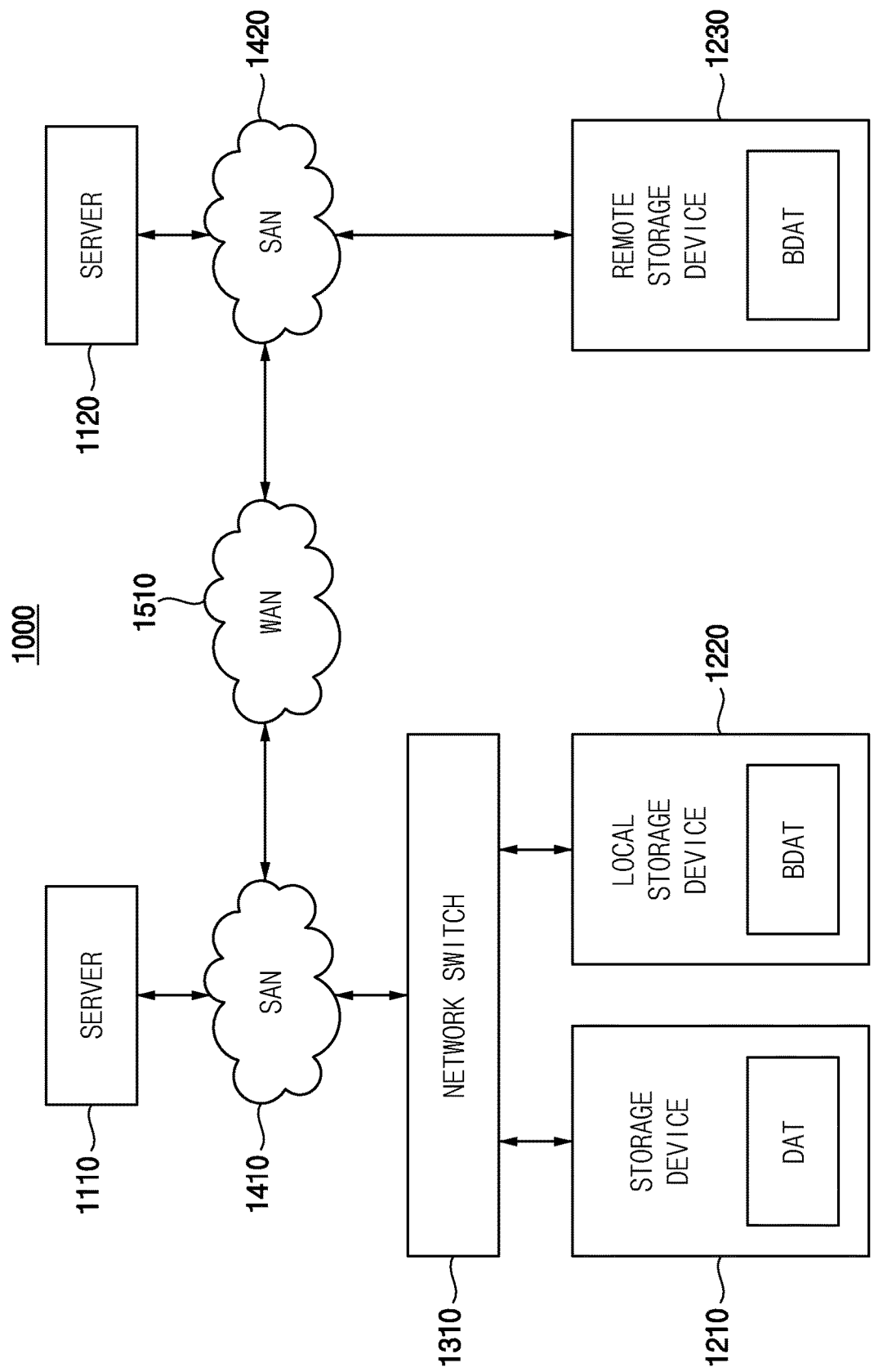
FIG. 18 is a block diagram illustrating a storage system according to example embodiments.

FIG. 18 is a block diagram illustrating a storage system including a storage device according to example embodiments. The descriptions repeated with FIG. 2 will be omitted.

Referring to FIG. 18, a storage system 1000 may include servers 1110 and 1120, a storage device 1210, backup storage devices 1220 and 1230, a network switch 1310 and networks 1410, 1420 and 1510.

The servers 1110 and 1120 may correspond to the host device 100 in FIG. 2. For example, each of the servers 1110 and 1120 may be a server on which an application is executed. For another example, each of the servers 1110 and 1120 may be a server that performs data replication and/or data backup.

The storage device 1210 may correspond corresponds to the storage device 200 in FIG. 2. The storage device 1210 may store the first data DAT. The backup storage devices 1220 and 1230 may correspond to the backup storage device 300 in FIG. 2. Each of the backup storage devices 1220 and 1230 may store the backup data BDAT.

The backup storage devices 1220 and 1230 may include a local storage device 1220 and a remote storage device 1230. The local storage device 1220 may be connected to the storage device 1210 through the network switch 1310, and may be disposed in the same local space as the storage device 1210. The remote storage device 1230 may be connected to the storage device 1210 through the network switch 1310 and the networks 1410, 1420 and 1510, and may be disposed in a remote space spaced apart from the storage device 1210.

Although FIG. 18 illustrates an example where one original data and two backup data (or replication data), e.g., a total of three data, are stored, example embodiments are not limited thereto.

The network switch 1310 may connect the storage device 1210 with the local storage device 1220 in the local space. For example, the network switch 1310 may be an Ethernet switch, but example embodiments are not limited thereto.

The networks 1410, 1420 and 1510 may correspond to the network 150 in FIG. 2. The networks 1410, 1420 and 1510 may connect the servers 1110 and 1120, the storage device 1210, the backup storage devices 1220 and 1230, and the network switch 1310 with each other. For example, each of the networks 1410 and 1420 may be a SAN and the network 1510 may be a WAN, but example embodiments are not limited thereto.

FIGS. 19A, 19B, 19C, 19D and 19E are diagrams for describing an NVMe-oF applied to a storage device according to example embodiments.

Figure 19A:
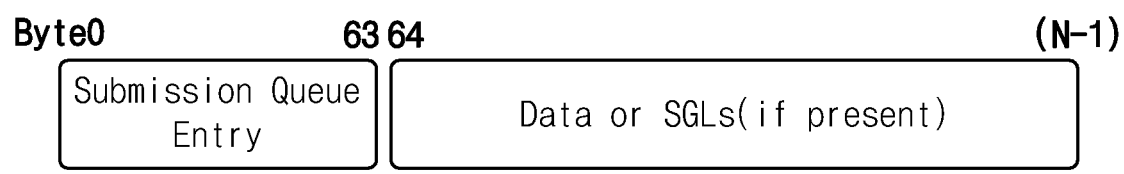
FIGS. 19A, 19B, 19C, 19D and 19E are diagrams for describing an NVMe-oF applied to a storage device according to example embodiments.
Figure 19B:
Figure 19C:
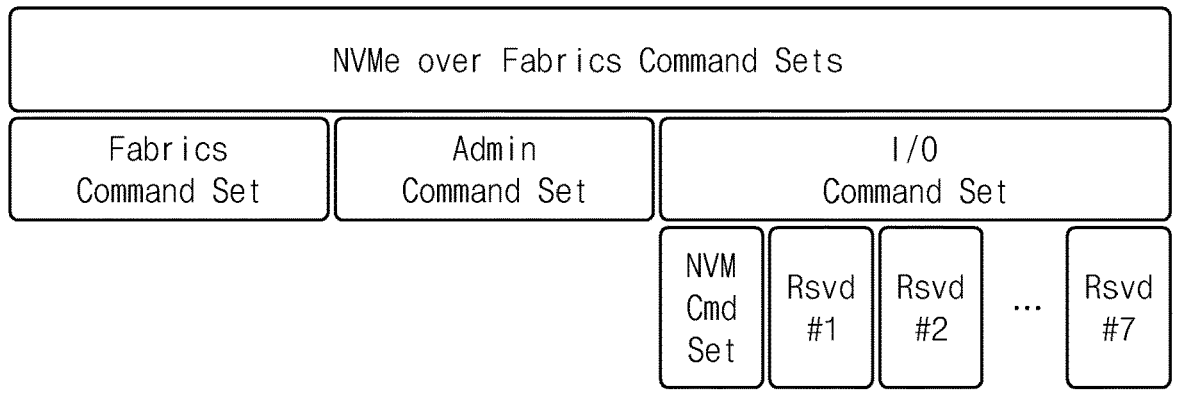

FIG. 19A illustrates an example of a command capsule used in the NVMe-oF. FIG. 19B illustrates an example of a response capsule used in the NVMe-oF. FIG. 19C illustrates an example of command sets used in the NVMe-oF.

A capsule is an NVMe unit of information exchange used in the NVMe-oF. A capsule may be classified as a command capsule or a response capsule. A command capsule may include a command (formatted as a submission queue entry (SQE)), and may optionally include scatter gather lists (SGLs) or data. A response capsule may include a response (formatted as a completion queue entry (CQE)), and may optionally include data. Data may include any data transferred at an NVMe layer between a host device and an NVM subsystem (e.g., logical block data or a data structure associated with a command). A capsule may be independent of any underlying NVMe transport unit (e.g., packet, message, or frame and associated headers and footers), and may include multiple such units.

Command capsules may be transferred from a host device to an NVM subsystem. The SQE may include an admin command, an I/O command, or a fabrics command. The minimum size of a command capsule may be NVMe Transport binding specific, but may be at least 64B in size. The maximum size of a command capsule may be NVMe Transport binding specific. Response capsules may be transferred from an NVM subsystem to a host device. The CQE may be associated with a previously issued admin command, I/O command, or fabrics command. The size of a response capsule may be NVMe Transport binding specific, but may be at least 16B in size. The maximum size of a response capsule may be NVMe Transport binding specific.

The NVMe-oF may support three command sets. The fabrics command set may be NVMe-oF specific. The admin and I/O command sets may be defined by the NVMe base specification. Fabrics command set commands may be used for operations specific to NVMe-oF including establishing connection, NVMe in-band authentication, and to get or set a property. All fabrics commands may be submitted on the admin queue and some fabrics commands may also be submitted on an I/O Queue. Unlike Admin and I/O commands, fabrics commands may be processed by a controller regardless of whether the controller is enabled (e.g., regardless of the state of CC.EN).

Figure 19D:
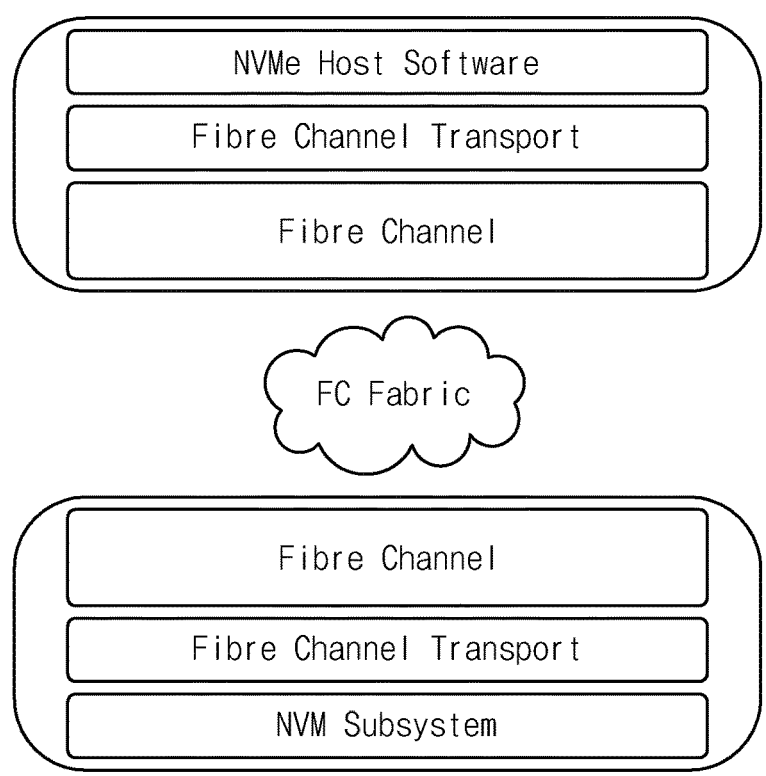
Figure 19E:
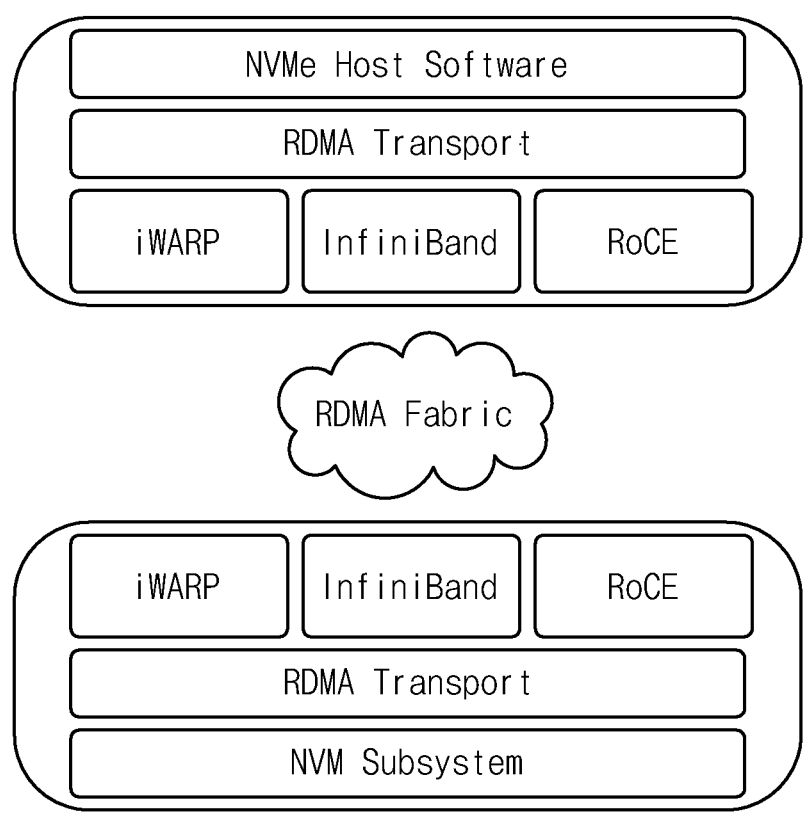

FIG. 19D illustrates an example of fibre channel (FC) transport protocol layers within a host device and an NVM subsystem. FIG. 19E illustrates an example of remote direct memory access (RDMA) transport protocol layers and RDMA providers (e.g., iWARP, InfiniBand and RoCE) within a host device and an NVM subsystem.

Commands, data and/or signals that are transmitted according to example embodiments may be implemented as illustrated in FIGS. 19A, 19B and 19C. Operations (e.g., operations S330 and S340 in FIG. 10) that are performed using the RDMA based on the NVMe-oF according to example embodiments may be implemented based on the examples illustrated in FIGS. 19D and 19E.

Figure 20:
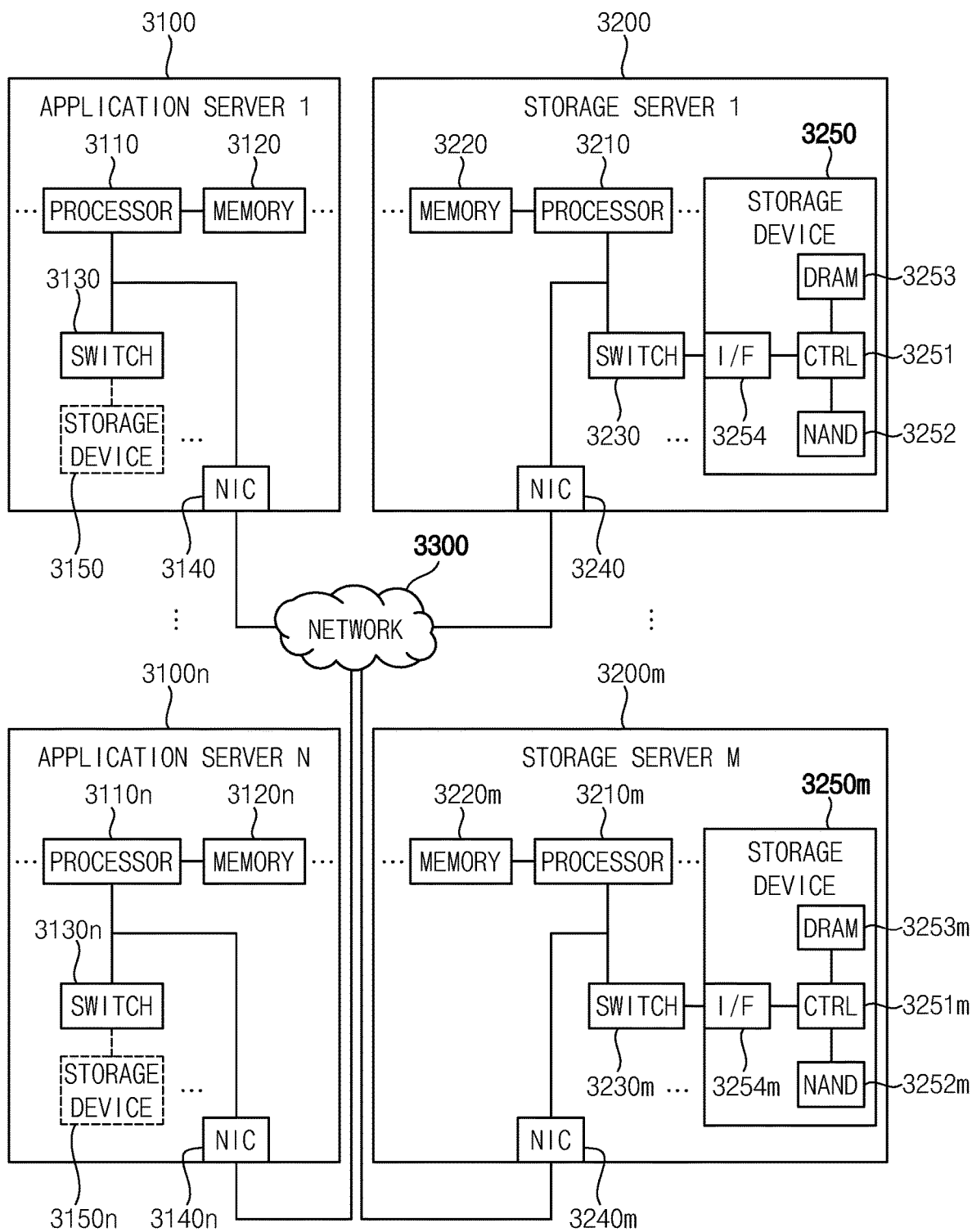
FIG. 20 is a block diagram illustrating a data center including a storage device according to example embodiments.

FIG. 20 is a block diagram illustrating a data center including a storage device according to example embodiments.

Referring to FIG. 20, a data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100n and storage servers 3200 to 3200m. The number of the application servers 3100 to 3100n and the number of the storage servers 3200 to 3200m may be variously selected according to example embodiments, and the number of the application servers 3100 to 3100n and the number of the storage servers 3200 to 3200m may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100n and the storage servers 3200 to 3200m may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200m may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120$n$ or a storage device 3150$n$ included in the other application server 3100$n$ through the network 3300, and/or may access the memories 3220 to 3220$m$ or the storage devices 3250 to 3250$m$ included in the storage servers 3200 to 3200$m$ through the network 3300. Thus, the application server 3100 may perform various operations on data stored in the application servers 3100 to 3100$n$ and/or the storage servers 3200 to 3200$m$. For example, the application server 3100 may execute a command for moving or copying data between the application servers 3100 to 3100$n$ and/or the storage servers 3200 to 3200$m$. The data may be transferred from the storage devices 3250 to 3250$m$ of the storage servers 3200 to 3200$m$ to the memories 3120 to 3120$n$ of the application servers 3100 to 3100$n$ directly or through the memories 3220 to 3220$m$ of the storage servers 3200 to 3200$m$. For example, the data transferred through the network 3300 may be encrypted data for security or privacy.

In the storage server 3200, an interface 3254 may provide a physical connection between the processor 3210 and a controller 3251 and/or a physical connection between a network interface card (MC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, a compute express link (CXL), an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200$m$ and/or the application servers 3100 to 3100$n$, the processor may transmit a command to the storage devices 3150 to 3150$n$ and 3250 to 3250$m$ or the memories 3120 to 3120$n$ and 3220 to 3220$m$ to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150$m$ and 3250 to 3250$m$ may transmit a control signal and command/address signals to NAND flash memory devices 3252 to 3252$m$ in response to a read command received from the processor. When data is read from the NAND flash memory devices 3252 to 3252$m$, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210$m$ in the other storage server 3200$m$, or the processors 3110 to 3110$n$ in the application servers 3100 to 3100$n$. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

Each of the storage devices 3250 to 3250$m$ may be the storage device according to example embodiments, and may perform the method of recovering data in the storage device according to example embodiments.

The inventive concept may be applied to various electronic devices and systems that include the storage devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

In some example embodiments, each of the components represented by a block, such as those illustrated in FIGS. 2-4, 18 and 20, may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of embodiments may be implemented in algorithms that execute on one or more processors. Furthermore, the components, elements, modules or units represented by a block or processing steps may employ any number of related art techniques for electronics configuration, signal processing and/or control, data processing and the like.

The foregoing is illustrative of example embodiments and is not to be construed as limiting thereof. Although some example embodiments have been described, those skilled in the art will readily appreciate that many modifications are possible without materially departing from example embodiments. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of recovering data in a storage device including a storage controller and a first storage region storing first data, the method comprising:
    receiving backup storage information associated with a backup storage device from a host device, both the host device and the backup storage device being external to the storage device, and the backup storage device being configured to store backup data corresponding to the first data;
    transmitting, by the storage controller, a read command for the first data to the first storage region;
    performing a data read operation on the first data;
    based on an unrecoverable data failure occurring while reading the first data, transmitting a first notification signal from the first storage region to the storage controller, wherein the first notification signal represents that the first data includes the unrecoverable data failure;
    based on the first notification signal, directly receiving the backup data corresponding to the first data from the backup storage device based on the backup storage information; and
    performing a data recovery operation for the first data based on the backup data.

2. The method of claim 1, wherein the directly receiving the backup data is performed directly between the backup storage device and the storage device without passing through the host device.

3. The method of claim 1, wherein the host device, the storage device and the backup storage device are connected to each other through a network.

4. The method of claim 3, wherein the storage device and the backup storage device are physically different from each other.

5. The method of claim 1, wherein receiving the backup storage information comprises:
    transmitting, by the storage device, a backup storage information request to the host device;
    transmitting, by the host device, the backup storage information to the storage device based on the backup storage information request; and
    recording, by the storage device, the backup storage information.

6. The method of claim 5, wherein the transmitting the backup storage information request to the host device, the transmitting the backup storage information to the storage device, and the recording the backup storage information are periodically performed, and
    wherein the method further comprises storing a result of the transmitting the backup storage information to the host device, the transmitting the backup storage information to the storage device, and the recording the backup storage information, into a nonvolatile memory provided in the storage device.

7. The method of claim 5, wherein the backup storage information comprises network address information associated with the backup storage device.

8. The method of claim 1, wherein the directly receiving the backup data comprises:
    collecting first information associated with the first data;
    searching the backup storage information based on the first information;
    directly transmitting, by the storage device, a read command packet for reading the backup data to the backup storage device; and
    directly transmitting, by the backup storage device, the backup data to the storage device based on the read command packet.

9. The method of claim 8, wherein the first information comprises any one or any combination of address information corresponding to the first data and information indicating a first storage region storing the first data.

10. The method of claim 1, wherein the performing the data read operation on the first data comprises;
    reading the first data based on the read command.

11. The method of claim 10, further comprising detecting, by the storage controller, the unrecoverable data failure included in the first data.

12. The method of claim 10, wherein the performing the data read operation on the first data further comprises, based on the unrecoverable data failure occurring with respect to the first data, performing an internal data recovery operation for the first data.

13. The method of claim 1, further comprising transmitting data recovery information associated with the first data to the host device.

14. The method of claim 1, further comprising performing a data write operation on the first data,
    wherein the receiving the backup storage information from the host device and the performing the data write operation on the first data are performed together.

15. The method of claim 14, further comprising performing a data replication operation in which the backup data is stored into the backup storage device,
    wherein the data replication operation and the data write operation on the first data are performed together.

16. The method of claim 15, wherein the backup storage device is a local storage device that is connected to the storage device through a network switch.

17. The method of claim 15, wherein the backup storage device is a remote storage device that is connected to the storage device through a network switch and at least one network.

18. A storage device comprising:
    a nonvolatile memory comprising a plurality of storage regions; and
    a storage controller configured to:
        receive backup storage information associated with a backup storage device from a host device, both the host device and the backup storage device being external to the storage device, and the backup storage device being configured to store backup data corresponding to first data;
transmit a read command for the first data to a first storage region, among the plurality of storage regions;
perform a data read operation on the first data;
based on an unrecoverable data failure occurring while reading the first data, receive a first notification signal from the first storage region to the storage controller, wherein the first notification signal represents that the first data includes the unrecoverable data failure;
based on the first notification signal, directly receive the backup data corresponding to the first data from the backup storage device based on the backup storage information; and
perform a data recovery operation for the first data based on the backup data.

19. A method of recovering data in a storage device including a storage controller and a first storage region storing first data, the method comprising:
performing a data write operation on first data;
receiving, from a host device, backup storage information associated with a backup storage device, both the host device and the backup storage device being external to the storage device, and the backup storage device being configured to store backup data corresponding to the first data;
transmitting a read command for the first data from the storage controller to the first storage region;
performing a data read operation on the first data;
based on an unrecoverable data failure occurring while reading the first data, transmitting a first notification signal from the first storage region to the storage controller, wherein the first notification signal represents that the first data includes the unrecoverable data failure;
based on the first notification signal, directly receiving the backup data corresponding to the first data from the backup storage device based on the backup storage information, the backup data being received from the backup storage device without passing through the host device; and
performing a data recovery operation for the first data based on the backup data,
wherein the receiving the backup storage information comprises:
transmitting, by the storage device, a backup storage information request to the host device;
transmitting, by the host device, the backup storage information to the storage device based on the backup storage information request; and
recording, by the storage device, the backup storage information, and
wherein the directly receiving the backup data comprises:
collecting first information associated with the first data on which the unrecoverable data failure has occurred;
searching the backup storage information based on the first information;
directly transmitting, by the storage device, a read command packet for reading the backup data to the backup storage device; and
directly transmitting, by the backup storage device, the backup data to the storage device based on the read command packet.

\* \* \* \* \*